United States Patent
Ivanovic et al.

(10) Patent No.: US 12,061,480 B2
(45) Date of Patent: Aug. 13, 2024

(54) CAUSING A MOBILE ROBOT TO MOVE ACCORDING TO A PLANNED TRAJECTORY DETERMINED FROM A PREDICTION OF AGENT STATES OF AGENTS IN AN ENVIRONMENT OF THE MOBILE ROBOT

(71) Applicants: Toyota Research Institute, Inc., Los Altos, CA (US); The Board of Trustees of the Leland Stanford Junior University, Stanford, CA (US)

(72) Inventors: Boris Ivanovic, Stanford, CA (US); Amine Elhafsi, Riverside, CA (US); Guy Rosman, Newton, MA (US); Adrien David Gaidon, Mountain View, CA (US); Marco Pavone, Stanford, CA (US)

(73) Assignees: Toyota Research Institute, Inc., Los Altos, CA (US); The Board of Trustees of the Leland Stanford Junior University, Stanford, CA (US)

( * ) Notice: Subject to any disclaimer, the term of this patent is extended or adjusted under 35 U.S.C. 154(b) by 483 days.

(21) Appl. No.: 17/228,165

(22) Filed: Apr. 12, 2021

(65) Prior Publication Data
US 2022/0066460 A1    Mar. 3, 2022

Related U.S. Application Data

(60) Provisional application No. 63/071,030, filed on Aug. 27, 2020.

(51) Int. Cl.
*G05D 1/00* (2024.01)
*G06F 18/214* (2023.01)
*G06N 3/08* (2023.01)

(52) U.S. Cl.
CPC ......... *G05D 1/0221* (2013.01); *G05D 1/0088* (2013.01); *G05D 1/0219* (2013.01);
(Continued)

(58) Field of Classification Search
CPC .. G05D 1/0221; G05D 1/0088; G05D 1/0219; G05D 1/0223; G05D 1/024;
(Continued)

(56) References Cited

U.S. PATENT DOCUMENTS

| | | | | |
|---|---|---|---|---|
| 2015/0011315 A1* | 1/2015 | Sofman | ................ | A63F 13/65 463/31 |
| 2017/0243070 A1* | 8/2017 | Janssen | ................ | G06T 7/73 |

(Continued)

FOREIGN PATENT DOCUMENTS

CA    2872419    11/2013

OTHER PUBLICATIONS

Rawlings et al., "Model Predictive Control: Theory, Computation, and Design" 2nd edition, Chapters 1 through 8, pp. 819 pages, 2017.
(Continued)

*Primary Examiner* — Kenneth J Malkowski
*Assistant Examiner* — Ibrahim Abdoalatif Alsomairy
(74) *Attorney, Agent, or Firm* — Christopher G. Darrow; Darrow Mustafa PC

(57) ABSTRACT

A mobile robot can be caused to move according to a planned trajectory. The mobile robot can be a vehicle. Information about agents in an environment of the mobile robot can be received from sensors. At a first time, a spatiotemporal graph can be produced. The spatiotemporal graph can represent relationships among the agents in the environment. The mobile robot can be one of the agents in the environment. Information from the spatiotemporal graph can be input to neural networks to produce information for a mixture of affine time-varying systems. The mixture of
(Continued)

affine time-varying systems can represent an evolution of agent states of the agents. Using the mixture of affine time-varying systems and information associated with the first time, a prediction of the agent states at a second time can be calculated. The mobile robot can be caused to move according to the planned trajectory determined from the prediction.

20 Claims, 7 Drawing Sheets

(52) U.S. Cl.
CPC ........... *G05D 1/0223* (2013.01); *G05D 1/024* (2013.01); *G06F 18/214* (2023.01); *G06N 3/08* (2013.01)

(58) Field of Classification Search
CPC .......... G05D 2201/0213; G06F 18/214; G06F 18/24143; G06N 3/08; G06N 3/044; G06N 3/045; G06N 5/022; B60W 2554/402; B60W 2554/4029; B60W 2554/4041; B60W 2556/20; B60W 60/00276; G06V 20/56
See application file for complete search history.

(56) References Cited

U.S. PATENT DOCUMENTS

| | | | |
|---|---|---|---|
| 2018/0231972 A1 | 8/2018 | Woon et al. | |
| 2019/0337507 A1* | 11/2019 | Stein | B60W 50/0097 |
| 2020/0026286 A1 | 1/2020 | Vozar et al. | |
| 2020/0324794 A1* | 10/2020 | Ma | B60W 60/00272 |

OTHER PUBLICATIONS

Helbing et al., "Social force model for pedestrian dynamics," Physical Review E, 51 (5) pp. 4282-4286, May 1995.
Wang et al., "Gaussian process dynamical models for human motion," IEEE Transactions on Pattern Analysis & Machine Intelligence, 30(2) pp. 283-298, 2008.
Lee et al., "Predicting wide receiver trajectories in American football," In IEEE 329 Winter Conf. on Applications of Computer Vision, pp. 1-9, 2016.
Li et al., "Game-theoretic modeling of multi vehicle interactions at uncontrolled intersections," IEEE Transactions on Intelligent Transportation Systems, pp. 1-15, 2019.
Alahi et al., "Social LSTM: Human trajectory prediction in crowded spaces," IEEE Conf. on Computer Vision and Pattern Recognition, pp. 1-11, 2016.
Sohn et al., "Learning structured output representation using deep conditional generative models," In Conf. on Neural Information Processing Systems, pp. 3483-3491, 2015.
Lee et al., "DESIRE: distant future prediction in dynamic scenes with interacting agents," In IEEE Conf. on Computer Vision and Pattern Recognition, pp. 336-345, 2017.
Ivanovic et al., "Generative modeling of multimodal multi-human behavior," In IEEE/RSJ Int. Conf. on Intelligent Robots & Systems, pp. 3088-3095, Madrid, 2018.
Deo et al., "Multi-modal trajectory prediction of surrounding vehicles with maneuver based lstms," In IEEE Intelligent Vehicles Symposium, pp. 1179-1184, 2018.
Sadeghian et al., "CAR-Net: Clairvoyant attentive recurrent network," In European Conf. on Computer Vision, pp. 151-167, 2018.
Ivanovic et al., "The Trajectron: Probabilistic multi-agent trajectory modeling with dynamic spatiotemporal graphs," In IEEE Int. Conf. on Computer Vision, pp. 2375-2384, 2019.
Salzmann et al., "Trajectron++: Dynamically-feasible trajectory forecasting with heterogeneous data," In European Conf. on Computer Vision, pp. 1-23, 2020.
Goodfellow et al., "Generative adversarial nets," In Conf. on Neural Information Processing Systems, pp. 1-9, 2014.
Gupta et al., "Social GAN: Socially acceptable trajectories with generative adversarial networks," In IEEE Conf. on Computer Vision and Pattern Recognition, pp. 2255-2264, 2018.
Zhao et al., "Multi-agent tensor fusion for contextual trajectory prediction," In IEEE Conf. on Computer Vision and Pattern Recognition, pp. 12126-12134, 2019.
Rudenko et al., "Human motion trajectory prediction: A survey," The International Journal of Robotics Research, vol. 39, issue 8, pp. 1-37, 2019.
Zeng et al., "End-to-end interpretable neural motion planner," In IEEE Conf. on Computer Vision and Pattern Recognition, pp. 8660-8669, 2019.
Ziegler et al., "Trajectory planning for bertha—a local, continuous method," In IEEE Intelligent Vehicles Symposium, pp. 450-457, Jun. 2014.
Liu et al., "Path planning for autonomous vehicles using model predictive control," In IEEE Intelligent Vehicles Symposium, pp. 174-179, 2017.
Fan et al., "Baidu apollo em motion planner," arXiv:1807.08048, pp. 1-15, Jul. 20, 2018.
Watter et al., "Embed to Control: A locally linear latent dynamics model for control from raw images," In Conf. on Neural Information Processing Systems, pp. 1-18, 2015.
Hafner et al., "Learning latent dynamics for planning from pixels," In Int. Conf. on Machine Learning, pp. 2555-2565, 2019.
Ichter et al., "Robot motion planning in learned latent spaces," IEEE Robotics and Automation Letters, pp. 2407-2414, Jul. 2019.
Kipf et al., "Neural relational inference for interacting systems," In Int. Conf. on Machine Learning, pp. 2688-2697, 2018.
Hochreiter et al., "Long short-term memory," Neural Computation, vol. 9, issue 8, pp. 1735-1780, 1997.
Britz et al., "Massive exploration of neural machine translation architectures," In Proc. of Conf. on Empirical Methods in Natural Language Processing, pp. 1442-1451, 2017.
Cho et al., "Learning phrase representations using rnn encoder-decoder for statistical machine translation," In Proc. of Conf. on Empirical Methods in Natural Language Processing, pp. 1724-1734, 2014.
Zhao et al., "InfoVAE: Balancing learning and inference in variational autoencoders," In Proc. AAAI Conf. on Artificial Intelligence, vol. 33, pp. 5885-5892, 2019.
Alsterda et al., "Contingency model predictive control for automated vehicles," 2019 American Control Conference, Philadelphia, PA, USA, pp. 717-722.
Leung et al., "On infusing reachability-based safety assurance within probabilistic planning frameworks for human-robot vehicle interactions," Proceedings of the 2018 International Symposium on Experimental Robotics, pp. 561-574.
Caesar et al., "nuScenes: A multimodal dataset for autonomous driving," Proceedings of the IEEE/CVF Conference on Computer Vision and Pattern Recognition, pp. 11621-11631, 2020.
Lavalle et al., "Better unicycle models. In Planning Algorithms," pp. 743-743, Cambridge Univ. Press, 2006.
Casas et al., "SpAGNN: Spatially-aware graph neural networks for relational behavior forecasting from sensor data," 2020 IEEE International Conference on Robotics and Automation, Paris, France, pp. 9491-9497, 2020.
Schmerling et al., "Multimodal probabilistic model-based planning for human-robot interaction," In Proc. IEEE Conf. on Robotics and Automation, Brisbane, QLD, Australia, pp. 3399-3406, 2018.
Lam et al., "Model predictive contouring control," 49th IEEE Conference on Decision and Control, pp. 6137-6142, Dec. 2010.
Liniger et al., "Optimization-based autonomous racing of 1:43 scale RC cars," Optimal Control Applications and Methods, vol. 36, issue 5, pp. 628-647, 2015.
Stellato et al., "OSQP: An operator splitting solver for quadratic programs," Mathematical Programming Computation, 2020, vol. 12, pp. 637-672.

(56) References Cited

OTHER PUBLICATIONS

Krishnan et al., "Towards Scalable Continuous-Time Trajectory Optimization for Multi-Robot Navigation," pp. 1-7, Oct. 2019, arXiv:1910.13463v1.

Oprzedkiewicz et al., "The agent, state-space model of the mobile robot," Pomiary Automatyka Robotyka, vol. 22, No. 3/2018, pp. 41-50.

Kanjanawanishkul et al., "Path Following for an Omnidirectional Mobile Robot Based on Model Predictive Control," 2009 IEEE International Conference on Robotics and Automation, Kobe, 2009, pp. 3341-3346.

Nilles et al., "Information Requirements of Collision-Based Micromanipulation," Proceedings of the Workshop on the Algorithmic Foundations of Robotics (WAFR), Oulu, Finland, pp. 21-23. 2020.

Pete Trautman "Sparse Interacting Gaussian Processes: Efficiency and Optimality Theorems of Autonomous Crowd Navigation," 2017 IEEE 56th Annual Conference on Decision and Control (CDC), Melbourne, VIC, 2017, pp. 327-334.

Unknown, "Tracklet," 1 page, last accessed May 22, 2016, found at https://en.wiktionary.org/wiki/tracklet.

Unknown, "Robotics/Navigation/Trajectory Planning," 3 pages, last accessed Jan. 24, 2021, found at https://en.wikibooks.org/wiki/Robotics/Navigation/Trajectory_Planning.

Unknown, "Motion planning," 9 pages, last accessed Jan. 3, 2021, found at https://en.wikipedia.org/wiki/Motion_planning.

Unknown, "Model predictive control," 7 pages, last accessed Apr. 1, 2021, found at https://en.wikipedia.org/wiki/Model_predictive_control.

\* cited by examiner

CAUSING A MOBILE ROBOT TO MOVE ACCORDING TO A PLANNED TRAJECTORY DETERMINED FROM A PREDICTION OF AGENT STATES OF AGENTS IN AN ENVIRONMENT OF THE MOBILE ROBOT

CROSS-REFERENCE TO RELATED APPLICATIONS

This application claims the benefit of U.S. Provisional Application No. 63/071,030, filed Aug. 27, 2020, which is incorporated herein in its entirety by reference.

TECHNICAL FIELD

The disclosed technologies are directed to causing a mobile robot to move according to a planned trajectory determined from a prediction of agent states of agents in an environment of the mobile robot. Specifically, the disclosed technologies are directed to causing a mobile robot to move according to a planned trajectory determined from a prediction, calculated using a mixture of affine time-varying systems, of agent states of agents in an environment of the mobile robot.

BACKGROUND

An autonomous motion technology system can be used to cause a mobile robot to move independently in an environment with one or more other agents and/or objects. Such an autonomous motion technology system can be arranged to perform functions in stages. Such stages can include, for example, a sensing stage, a perception stage, and a decision stage. The sensing stage can include technologies through which the mobile robot can detect, for example, information about the one or more other agents and/or objects in the environment and/or information about a location and/or a movement of the mobile robot. The perception stage can perform functions on information from the sensing stage to produce information that facilitates a better understanding of the environment of the mobile robot. Such functions can include, for example, localization of the mobile robot, recognition of the one or more other agents and/or objects, and tracking a motion of the one or more other agents and/or objects. Localization can include functions to determine a position of the mobile robot with a margin of error of less than a decimeter. The decision stage can perform functions on information from the perception stage to produce, by a prediction system, one or more predictions about trajectories of the one or more agents, to produce, by a planning system and based on the one or more predictions, a planned trajectory for the mobile robot, and to produce, by the planning system, a control signal to cause the mobile robot to move according to the planned trajectory. For example, the mobile robot can be an autonomous vehicle. For example, the control signal can be communicated via a controller area network (CAN) bus to one or more vehicle systems of the autonomous vehicle to realize movement of the autonomous vehicle according to the planned trajectory. The one or more vehicle systems can include, for example, a propulsion system, a braking system, a steering system, a throttle system, a transmission system, a signaling system, and/or a navigation system.

SUMMARY

In an embodiment, a system for causing a mobile robot to move according to a planned trajectory can include a processor and a memory. The memory can store an affine time-varying system production module and a planned trajectory production module. The affine time-varying system production module can include instructions that when executed by the processor cause the processor to produce, at a first time, a spatiotemporal graph representing relationships among agents in an environment of the mobile robot. The affine time-varying system production module can also include instructions that when executed by the processor cause the processor to input information from the spatiotemporal graph to neural networks to produce some information for a mixture of affine time-varying systems representing an evolution of agent states. The planned trajectory production module can include instructions that when executed by the processor cause the processor to calculate, using the mixture of affine time-varying systems and information associated with the first time, a prediction of the agent states at a second time. The planned trajectory production module can also include instructions that when executed by the processor cause the processor to cause the mobile robot to move according to the planned trajectory determined from the prediction.

In another embodiment, a method for causing a mobile robot to move according to a planned trajectory can include producing, by a processor at a first time, a spatiotemporal graph representing relationships among agents in an environment of the mobile robot. The method can include inputting, by the processor, information from the spatiotemporal graph to neural networks to produce some information for a mixture of affine time-varying systems representing an evolution of agent states. The method can include calculating, by the processor using the mixture of affine time-varying systems and information associated with the first time, a prediction of the agent states at a second time. The method can include causing, by the processor, the mobile robot to move according to the planned trajectory determined from the prediction.

In another embodiment, a non-transitory computer-readable medium for causing a mobile robot to move according to a planned trajectory can include instructions that when executed by one or more processors cause the one or more processors to produce, at a first time, a spatiotemporal graph representing relationships among agents in an environment of the mobile robot. The non-transitory computer-readable medium can include instructions that when executed by the one or more processors cause the one or more processors to input information from the spatiotemporal graph to neural networks to produce some information for a mixture of affine time-varying systems representing an evolution of agent states. The non-transitory computer-readable medium can include instructions that when executed by the one or more processors cause the one or more processors to calculate, using the mixture of affine time-varying systems and information associated with the first time, a prediction of the agent states at a second time. The non-transitory computer-readable medium can include instructions that when executed by the one or more processors cause the one or more processors to cause the mobile robot to move according to the planned trajectory determined from the prediction.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies can be used to cause a mobile robot to move according to a planned trajectory. For example, the mobile robot can be an autonomous vehicle. For example, a processor can receive, from one or more sensors, information about agents in an environment of the mobile robot. The processor, at a first time, can produce a spatiotemporal graph. The spatiotemporal graph can represent relationships among the agents. For example, the mobile robot can be one of the agents in the environment. The processor can input information from the spatiotemporal graph to neural networks to produce some information for a mixture of affine time-varying systems representing an evolution of agent states. The processor can calculate, using the mixture of affine time-varying systems and information associated with the first time, a prediction of the agent states at a second time. The processor can cause the mobile robot to move according to the planned trajectory determined from the prediction.

A model predictive control (MPC) framework can be an effective tool for a planning system to use to produce a planned trajectory for a mobile robot. However, a conventional prediction system typically is configured to produce, for each agent in an environment of the mobile robot, a prediction about an individual trajectory of a corresponding agent. Thus, a typical conventional prediction system is configured to produce a set of predictions. Unfortunately, integrating such a set of predictions so that they can be used in a planning system that is based on a model predictive control framework can be difficult. Fortunately, the disclosed technologies use a mixture of affine time-varying systems to represent an evolution of agent states of agents in the environment of the mobile robot. That is, the disclosed technologies can produce a model, of the agent states, that includes multiple affine time-varying systems that are probabilistically combined as a mixture model. The mixture model can be represented in a form that facilitates directly incorporating the mixture of affine time-varying systems into a prediction system and into a planning system that is based on a model predictive control framework. Therefore, the disclosed technologies can improve computational efficiency in executions of functions of a prediction system component of an autonomous motion technology system and in executions of functions of a planning system component of the autonomous motion technology system.

Figure 1:
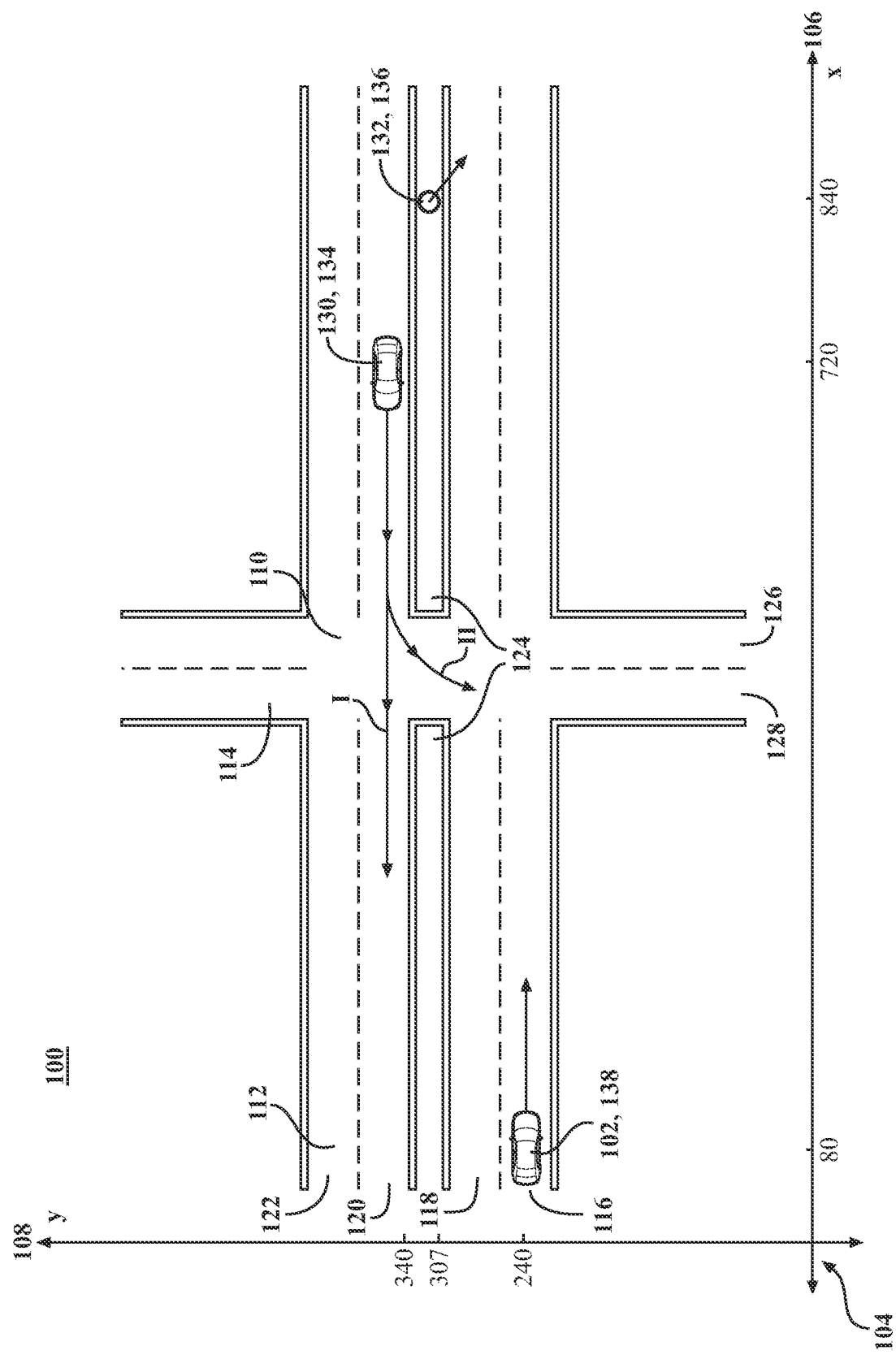
FIG. 1 is a diagram that illustrates an example of an environment for causing a mobile robot to move according to a planned trajectory, according to the disclosed technologies.

FIG. 1 is a diagram that illustrates an example of an environment 100 for causing a mobile robot 102 to move according to a planned trajectory, according to the disclosed technologies. For example, positions of agents and/or objects in the environment 100 can be specified with respect to a coordinate system 104. The coordinate system 104 can have a first dimension 106 ($x$) and a second dimension 108 ($y$). For example, the environment 100 can include an intersection 110 of a first road 112 and a second road 114. For example, the first road 112 can be disposed along a line parallel with the first dimension 106 ($x$) and the second road 114 can be disposed along a line parallel with the second dimension 108 ($y$). For example, the first road 112 can include a right lane 116 for traffic in a positive direction along the first dimension 106 ($x$), a left lane 118 for the traffic in the positive direction along the first dimension 106 ($x$), a left lane 120 for traffic in a negative direction along the first dimension 106 ($x$), and a right lane 122 for the traffic in the negative direction along the first dimension 106 ($x$). For example, the first road 112 can include a median 124 between the left lane 118 and the left lane 120. For example, the second road 114 can include a lane 126 for traffic in a positive direction along the second dimension 108 ($y$) and a lane 128 for traffic in a negative direction along the second dimension 108 ($y$). For example, the environment 100 can include a first agent 130 and a second agent 132. For example, the first agent 130 can be a vehicle 134. For example, the second agent 132 can be a pedestrian 136. For example, the mobile robot 102 can be an autonomous vehicle 138.

Figure 2:
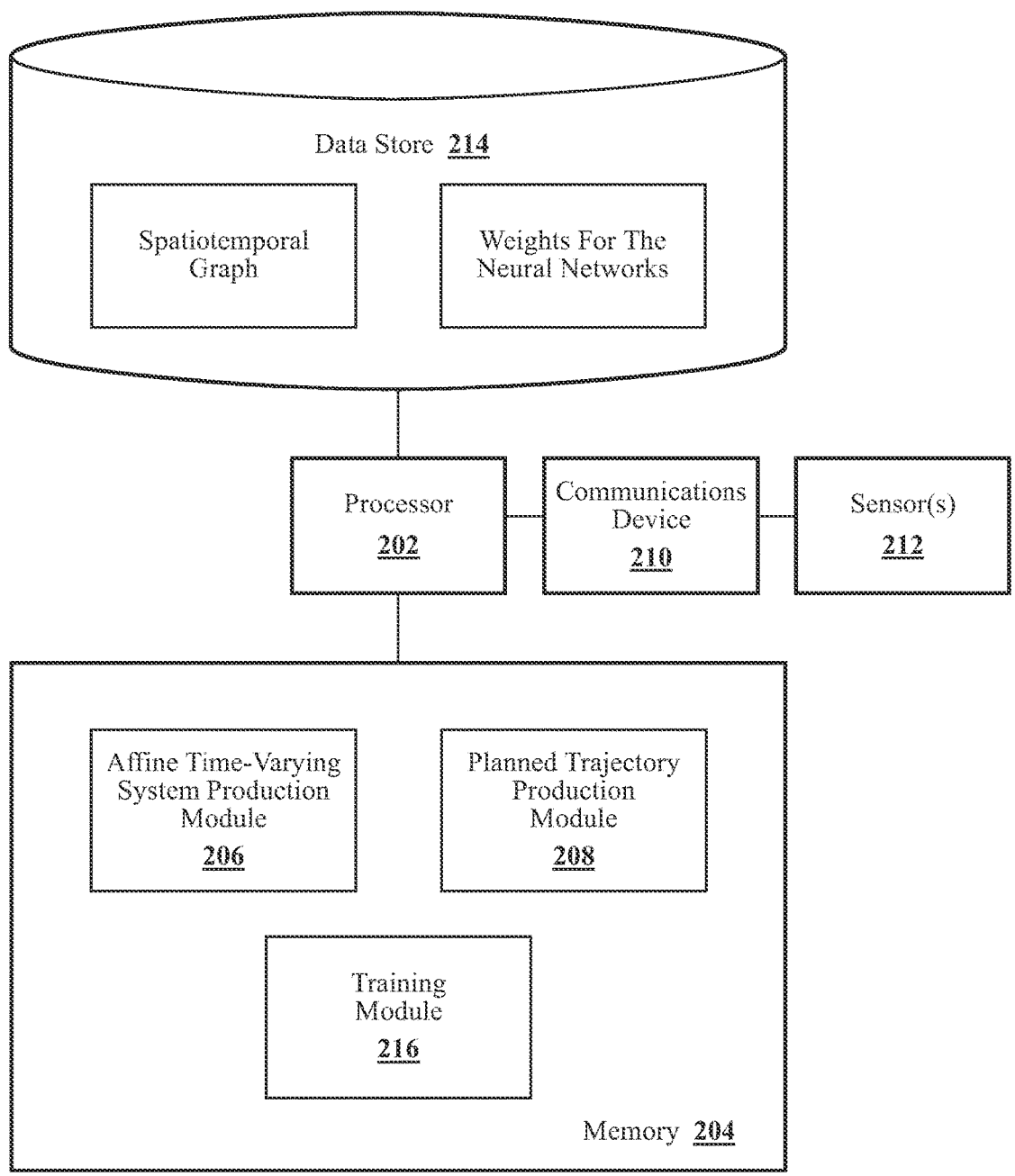
FIG. 2 is a block diagram that illustrates an example of a system for causing a mobile robot to move according to a planned trajectory, according to the disclosed technologies.

FIG. 2 is a block diagram that illustrates an example of a system 200 for causing a mobile robot to move according to a planned trajectory, according to the disclosed technologies. The system 200 can include, for example, a processor 202 and a memory 204. The memory 204 can be communicably coupled to the processor 202. For example, the memory 204 can store an affine time-varying system production module 206 and a planned trajectory production module 208. For example, the mobile robot can an autonomous vehicle. For example, the mobile robot can be the mobile robot 102 illustrated in FIG. 1.

In a first configuration, the system 200 can further include a communications device 210. The communications device 210 can be communicably coupled to the processor 202. The communications device 210 can be configured to receive, from one or more sensors 212, information about agents in an environment of the mobile robot.

The affine time-varying system production module 206 can include instructions that function to control the processor 202 to produce, at a first time, a spatiotemporal graph. For example, at least some of these instructions can be included in a prediction system component of an autonomous motion technology system. The spatiotemporal graph can represent relationships among the agents in the environment of the mobile robot. For example, the system 200 can further include a data store 214. The data store 214 can be communicably coupled to the processor 202. The data store 214 can be configured to store the spatiotemporal graph.

The affine time-varying system production module 206 can also include instructions that function to control the processor 202 to input information from the spatiotemporal graph to neural networks. For example, at least some of these instructions can be included in a prediction system component of an autonomous motion technology system. The neural networks can be configured to produce some information for a mixture of affine time-varying systems. The mixture of affine time-varying systems can represent an evolution of agent states in the environment.

The planned trajectory production module 208 can include instructions that function to control the processor 202 to calculate, using the mixture of affine time-varying systems and information associated with the first time, a prediction of the agent states at a second time. For example, at least some of these instructions can be included in a prediction system component of an autonomous motion technology system.

The planned trajectory production module 208 can also include instructions that function to control the processor 202 to cause the mobile robot to move according to the planned trajectory determined from the prediction. For example, at least some of these instructions can be included in a planning system component of an autonomous motion technology system.

For example, the mobile robot can be one of the agents in the environment. For example, the mixture of affine time-varying systems can represent the evolution of the agent states in equal intervals of time. The second time can be a single interval of time after the first time.

For example, the spatiotemporal graph can represent a single agent, of the agents, as a node. The spatiotemporal graph can include a directed edge from a first node to a second node. The second node can have a first state history. The first state history can be for a first specific count of the equal intervals of time before the first time. The first state history can be encoded by a first neural network of the neural networks. For example, the first neural network can be a first long short-term memory neural network. For example, the first neural network can have 32 hidden dimensions. The first node can have a second state history. The second state history can be for the first specific count of the equal intervals of time before the first time. The first node can have a modified state history. The modified state history can be a difference between the second state history and a state of the second node at the first time. The modified state history can be encoded by a second neural network of the neural networks. For example, the second neural network can be a second long short-term memory neural network. For example, the second neural network can have 32 hidden dimensions.

For example, a motion plan of the mobile robot for a second specific count of the equal intervals of time after the first time can be encoded by a third neural network of the neural networks. For example, the third neural network can be a bi-directional long short-term memory neural network. For example, the third neural network can have 32 hidden dimensions.

For example, an output of the first neural network, an output of the second neural network, and an output of the third neural network can be included in a concatenated vector.

For example, the concatenated vector can be decoded by a fourth neural network of the neural networks to produce matrices for the first time. For example, the fourth neural network can be a gated recurrent unit neural network. For example, the fourth neural network can be a 128-dimensional gated recurrent unit neural network.

Figure 3:
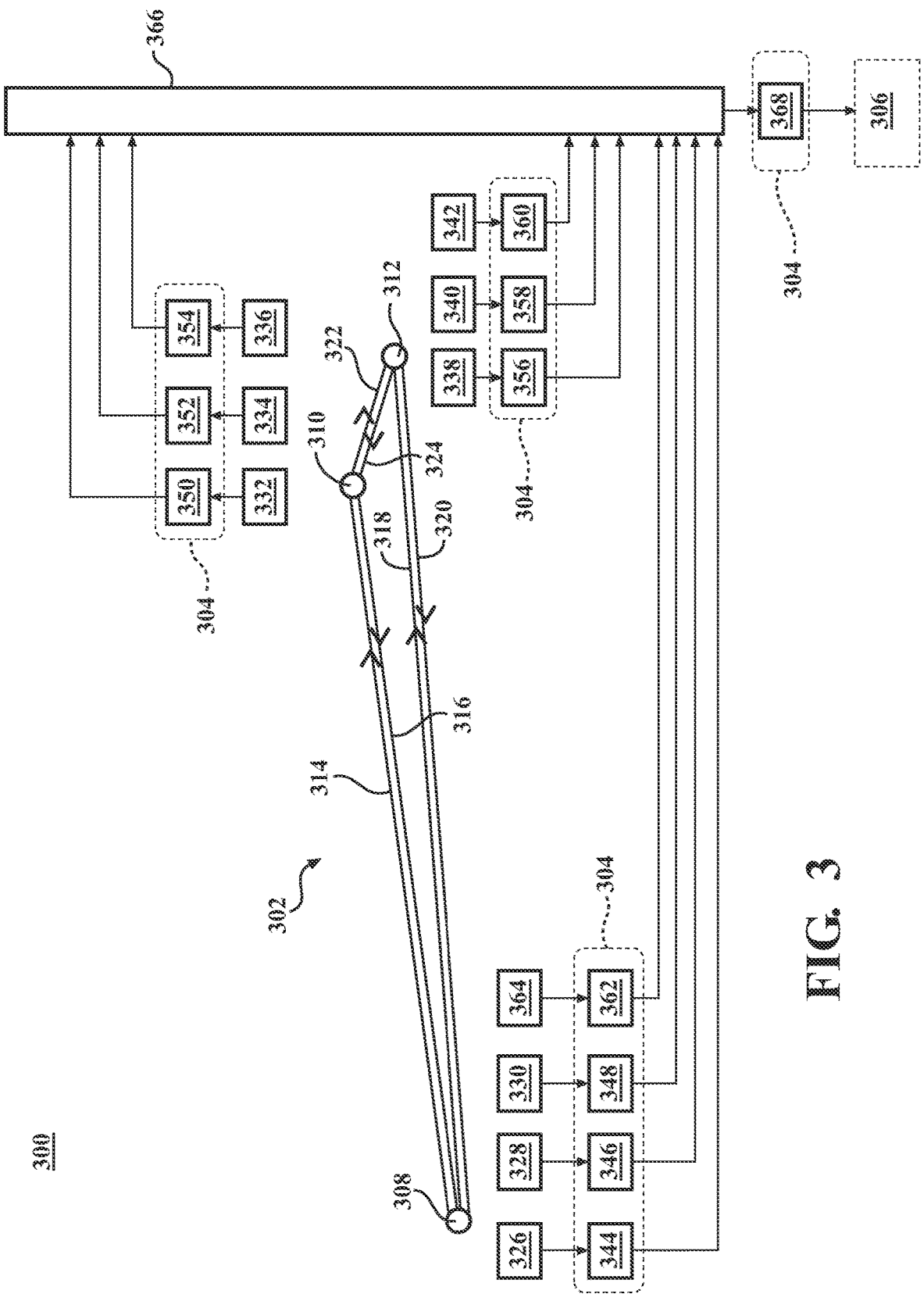
FIG. 3 is a diagram that illustrates an example of inputting information associated with a spatiotemporal graph to neural networks to produce matrices for a mixture of affine time-varying systems that represents an evolution of agent states of agents in the environment illustrated in FIG. 1, according to the disclosed technologies.

FIG. 3 is a diagram that illustrates an example 300 of inputting information associated with a spatiotemporal graph 302 to neural networks 304 to produce matrices 306 for a mixture of affine time-varying systems that represents an evolution of agent states of agents in the environment 100, according to the disclosed technologies.

The spatiotemporal graph 302 can include, for example, a first node 308 (that corresponds to the mobile robot 102 illustrated in FIG. 1), a second node 310 (that corresponds to the first agent 130 illustrated in FIG. 1), and a third node 312 (that corresponds to the second agent 132 illustrated in FIG. 1). The spatiotemporal graph 302 can further include, for example, a first directed edge 314 (from the first node 308 to the second node 310), a second directed edge 316 (from the second node 310 to the first node 308), a third directed edge 318 (from the first node 308 to the third node 312), a fourth directed edge 320 (from the third node 312 to the first node 308), a fifth directed edge 322 (from the second node 310 to the third node 312), and a sixth directed edge 324 (from the third node 312 to the second node 310).

The first node 308 can include, for example, a state history 326, a first modified state history 328 (with respect to the second node 310), and a second modified state history 330 (with respect to the third node 312). The second node 310 can include, for example, a state history 332, a first modified state history 334 (with respect to the first node 308), and a second modified state history 336 (with respect to the third node 312). The third node 312 can include, for example, a state history 338, a first modified state history 340 (with respect to the first node 308), and a second modified state history 342 (with respect to the second node 310).

The neural networks 304 can include, for example, a first neural network 344 (configured to encode the state history 326), a second neural network 346 (configured to encode the first modified state history 328), a third neural network 348 (configured to encode the second modified state history 330), a fourth neural network 350 (configured to encode the state history 332), a fifth neural network 352 (configured to encode the first modified state history 334), a sixth neural network 354 (configured to encode the second modified state history 336), a seventh neural network 356 (configured to encode the state history 338), an eighth neural network 358 (configured to encode the first modified state history 340), and a ninth neural network 360 (configured to encode the second modified state history 342).

The neural networks 304 can further include, for example, a tenth neural network 362 configured to encode a motion plan 364 of the first node 308 (that corresponds to the mobile robot 102 illustrated in FIG. 1).

The example 300 can further include, for example, a concatenated vector 366. The concatenated vector 366 can include an output of the first neural network 344, an output of the second neural network 346, an output of the third neural network 348, an output of the fourth neural network 350, an output of the fifth neural network 352, an output of the sixth neural network 354, an output of the seventh neural network 356, an output of the eighth neural network 358, an output of the ninth neural network 360, and an output of the tenth neural network 362.

The neural networks 304 can further include, for example, an eleventh neural network 368 configured to decode the concatenated vector 366 to produce the matrices 306 for the mixture of affine time-varying systems.

Returning to FIG. 2, in a second configuration, the memory 204 can further store a training module 216. The training module 216 can include instructions that function to control the processor 202 to train the neural networks.

In a specific implementation of the second configuration, the instructions that train the neural networks can include instructions that function to control the processor 202 to receive a set of training data. The instructions that train the neural networks can also include instructions that function to control the processor 202 to perform, using the set of training data, a training operation of the neural networks with respect to a loss function. The instructions that train the neural networks can also include instructions that function to control the processor 202 to produce, in response to the training operation, a set of weights for the neural networks. For example, the data store 214 can be configured to store the set of weights for the neural networks.

Additionally, for example, the mixture of affine time-varying systems can represent the evolution of the agent states for a first mode and a second mode (and one or more additional modes). The first mode can be associated with a set of actions associated with a first scenario in the environment. The second mode can be associated with a set of actions associated with a second scenario in the environment. In this example, the matrices for the first time can include: (1) first matrices for the first time and the first mode and (2) second matrices for the first time and the second mode.

With reference to FIG. 1, for example, a first mode I can be associated with a set of actions associated with traffic in the left lane 120 proceeding straight through the intersection 110; and a second mode II can be associated with a set of actions associated with traffic in the left lane 120 making, at the intersection 110, a left turn into the lane 128.

Returning to FIG. 2, in the specific implementation of the second configuration for this example, the instructions that train the neural networks can include instructions that function to control the processor 202 to receive a set of training data. The instructions that train the neural networks can also include instructions that function to control the processor 202 to perform, using the set of training data, a training operation of the neural networks with respect to a loss function that accounts for the first mode and the second mode (and the one or more additional modes). The instructions that train the neural networks can also include instructions that function to control the processor 202 to produce, in response to the training operation, a set of weights for the neural networks. For example, the data store 214 can be configured to store the set of weights for the neural networks.

For example, a loss function that accounts for modes can be:

$$\mathbb{E}_{z \sim q(\cdot|x,y,u_R)}[\log p(y|z,x,u_R)] - \beta D_{KL}(q(z|x,y,u_R)\|p(z|x,u_R)) + \alpha I_q(x;z)$$

in which x represents agent states from a time that is the first specific count of the equal intervals of time before the first time to the first time, y represents agent states from a time that is a single interval of time after the first time to a time that is the second specific count of the equal intervals of time after the first time, $u_R$ represents a variable that represents a future motion plan of the mobile robot, z represents a mode of evolution of the agent states in a set of Z modes, q is produced in a training operation (e.g., from a bi-directional long short-term memory neural network with 32 hidden dimensions that encodes each agent's future trajectory), $D_{KL}$ is the Kullback-Liebler divergence, $I_q$ denotes mutual information, β is a weighting parameter that indicates an importance of $D_{KL}$ in the loss function, and α is a weighting parameter that indicates an importance of $I_q$ in the loss function.

For example, the some information for the mixture of affine time-varying systems produced by the neural networks can include: (1) some information for an autonomous term of the mixture of affine time-varying systems and (2) some information for a controlled term of the mixture of affine time-varying systems. The autonomous term can be included to represent the evolution of the agent states in an absence of control. The controlled term can be included to represent an effect of a control of the mobile robot on the evolution of the agent states.

For example, information for the autonomous term of the mixture of affine time-varying systems can include a first matrix. A first agent of the agents can be associated with a first row of the first matrix and a first column of the first matrix. A second agent of the agents can be associated with a second row of the first matrix and a second column of the first matrix. (One or more additional agents can be associated with one or more additional rows of the first matrix and one or more additional columns of the first matrix.) An element of the first matrix can represent an effect, at the first time, that an agent associated with a column of the element has on an agent associated with a row of the element.

Additionally, for example, information for elements of the first matrix associated with a row for the mobile robot can be determined from a source different from the neural networks. For example, because the element of the row for the mobile robot that represents the effect that the mobile robot has on itself can be determined by dynamics, information for this element does not need to be determined from the neural networks. For example, because in an absence of control other agents in the environment do not have an effect on the mobile robot, an element of the row for the mobile robot that represents an effect that an agent (other than the mobile robot) has on the mobile robot can be set to zero and, therefore, does not need to be determined from the neural networks.

Additionally, for example, information for a specific element of the first matrix in which an agent associated with a column of the specific element is the agent associated with a row of the specific element can determined from the source different from the neural networks. For example, because an element that represents an effect that an agent has on itself can be determined by dynamics, information for this element does not need to be determined from the neural networks.

For example, an element of the first matrix can include a sub-matrix. A count of a number of rows of the sub-matrix can be equal to a count of a number of agent states of a corresponding agent being represented by the mixture of affine time-varying systems. A count of a number of columns of the sub-matrix can be equal to the count of the number of rows of the sub-matrix.

For example, if the corresponding agent is a vehicle, then the agent states of the corresponding agent can include: (1) a position of the vehicle with respect to a coordinate system including: (a) a measure of the position with respect to a first dimension of the coordinate system and (b) a measure of the position with respect to a second dimension of the coordinate system, (2) a direction of a movement of the vehicle from the position, and (3) a speed of the movement.

With reference to FIG. 1, for example, the agent states of the mobile robot 102 (e.g., the autonomous vehicle 138) can include: (1) a position that includes: (a) a measure of 80 decimeters with respect to the first dimension 106 ($x$) and (b) a measure of 240 decimeters with respect to the second dimension 108 ($y$), (2) a direction of movement in a positive direction along the first dimension 106 ($x$), and (3) a speed of 30 miles per hour.

For example, the agent states of the first agent 130 (e.g., the vehicle 134) can include: (1) a position that includes: (a) a measure of 720 decimeters with respect to the first dimension 106 ($x$) and (b) a measure of 340 decimeters with respect to the second dimension 108 ($y$), (2) a direction of movement in a negative direction along the first dimension 106 ($x$), and (3) a speed of 30 miles per hour.

For example, if the corresponding agent is a pedestrian, then the agent states of the corresponding agent can include: (1) a position of the pedestrian with respect to a coordinate system including: (a) a measure of the position with respect to a first dimension of the coordinate system and (b) a measure of the position with respect to a second dimension of the coordinate system and (2) a rate of change of the position with respect to time including: (a) a measure of the rate of change with respect to the first dimension and (b) a measure of the rate of change with respect to the second dimension.

For example, the agent states of the second agent 132 (e.g., the pedestrian 136) can include: (1) a position that includes: (a) a measure of 840 decimeters with respect to the first dimension 106 ($x$) and (b) a measure of 307 decimeters with respect to the second dimension 108 ($y$), (2) a rate of change of the position with respect to time that includes: (a) a measure of 9 decimeters per second in a positive direction with respect to the first dimension 106 ($x$) and (b) a measure of 9 decimeters per second in a negative direction with respect to the second dimension 108 ($y$).

Returning to FIG. 2, additionally, for example, the information for the autonomous term of the mixture of affine time-varying systems can further include a second matrix. A first row of the second matrix can be associated with the first agent. A second row of the second matrix can be associated with the second agent. (One or more additional rows of the second matrix can be associated with one or more additional agents.) An element of the second matrix can represent states of a corresponding agent at the first time. The autonomous term can be a product of the first matrix multiplied by the second matrix.

For example, information for the controlled term of the mixture of affine time-varying systems can include a matrix. The matrix can have a single column. A first agent of the agents can be associated with a first row of the matrix. A second agent of the agents can be associated with a second row of the matrix. (One or more additional agents can be associated with one or more additional rows of the matrix.) An element of the matrix can represent an effect, at the first time, that the control of the mobile robot has on an agent associated with a row of the element.

Additionally, for example, information for an element of the matrix associated with a row for the mobile robot can be determined from a source different from the neural networks. For example, because an effect of a control of the mobile robot on itself is known, this element does not need to be determined from the neural networks.

Additionally, for example, the information for the controlled term of the mixture of affine time-varying systems can further include a variable that represents a future motion plan of the mobile robot at the first time. The controlled term can be a product of the matrix multiplied by the variable.

Additionally, for example, the some information for the mixture of affine time-varying systems produced by the neural networks can further include some information for an uncertainty term of the mixture of affine time-varying systems. The uncertainty term can be included to represent an effect, at the first time, of an uncertainty of the prediction.

For example, information for the uncertainty term of the mixture of affine time-varying systems can include a matrix. The matrix can have a single column. A first agent of the agents can be associated with a first row of the matrix. A second agent of the agents can be associated with a second row of the matrix. (One or more additional agents can be associated with one or more additional rows of the matrix.) An element of the matrix can represent an effect that the uncertainty of the prediction has on an agent associated with a row of the element.

Additionally, for example, information for an element of the matrix associated with a row for the mobile robot can be determined from a source different from the neural networks. For example, because a current position, a control, and dynamics of the mobile robot are known, this element does not need to be determined from the neural networks. Moreover, because these parameters are known, there is little to no uncertainty about a next position of the mobile robot. Therefore, a value of this element likely can be zero or a small value (e.g., to account for a small degree of uncertainty associated with an even such as tire slippage).

Additionally, for example, the information for the uncertainty term of the mixture of affine time-varying systems can further include a variable that represents a distribution of noise in the mixture of affine time-varying systems at the first time. For example, because Gaussian distributions of noise have been well studied and are computationally efficient, the distribution of noise can be a Gaussian distribution of noise. The uncertainty term can be a product of the matrix multiplied by the variable.

Additionally, for example, the information for the mixture of affine time-varying systems can further include an affine term of the mixture of affine time-varying systems. The affine term can be included to represent a nonlinear aspect of the evolution of the agent states. That is, the affine term can be included to account for nonlinear aspects in a linearized mixture of affine time-varying systems. Information for the affine term of the mixture of affine time-varying systems can include a matrix. The matrix can have a single column. A first agent of the agents can be associated with a first row of the matrix. A second agent of the agents can be associated with a second row of the matrix. (One or more additional agents can be associated with one or more additional rows of the matrix.) An element of the matrix can represent an effect, at the first time, that the nonlinear aspect has on an agent associated with a row of the element. For example, information for elements of the matrix can be determined from a source different from the neural networks. For example, because dynamics of the agents are known, these elements do not need to be determined from the neural networks. For example, in a situation in which information for an element of the matrix associated with a row for an agent that lacks nonlinear aspects (e.g., a pedestrian), a value of this element can be zero.

For example, an equation for the mixture of affine time-varying systems can be:

$$s_z^{(t+1)} = A_z^{(t)} s_z^{(t)} + B_z^{(t)} u_R^{(t)} + c_z^{(t)} + Q_z^{(t)} w^{(t)}$$

in which s represents the agent states, z represents a mode of evolution of the agent states, A represents a matrix for the autonomous term that represents the evolution of the agent states in an absence of control, B represents a matrix for the controlled term that represents an effect of a control of the mobile robot on the evolution of the agent states, $u_R$ represents a variable that represents a future motion plan of the mobile robot, c represents a matrix for the affine term that represents a nonlinear aspect of the evolution of the agent states, Q represents a matrix for the uncertainty term that represents an effect of an uncertainty of the prediction, and w represents a variable that represents a distribution of noise.

Figure 4:
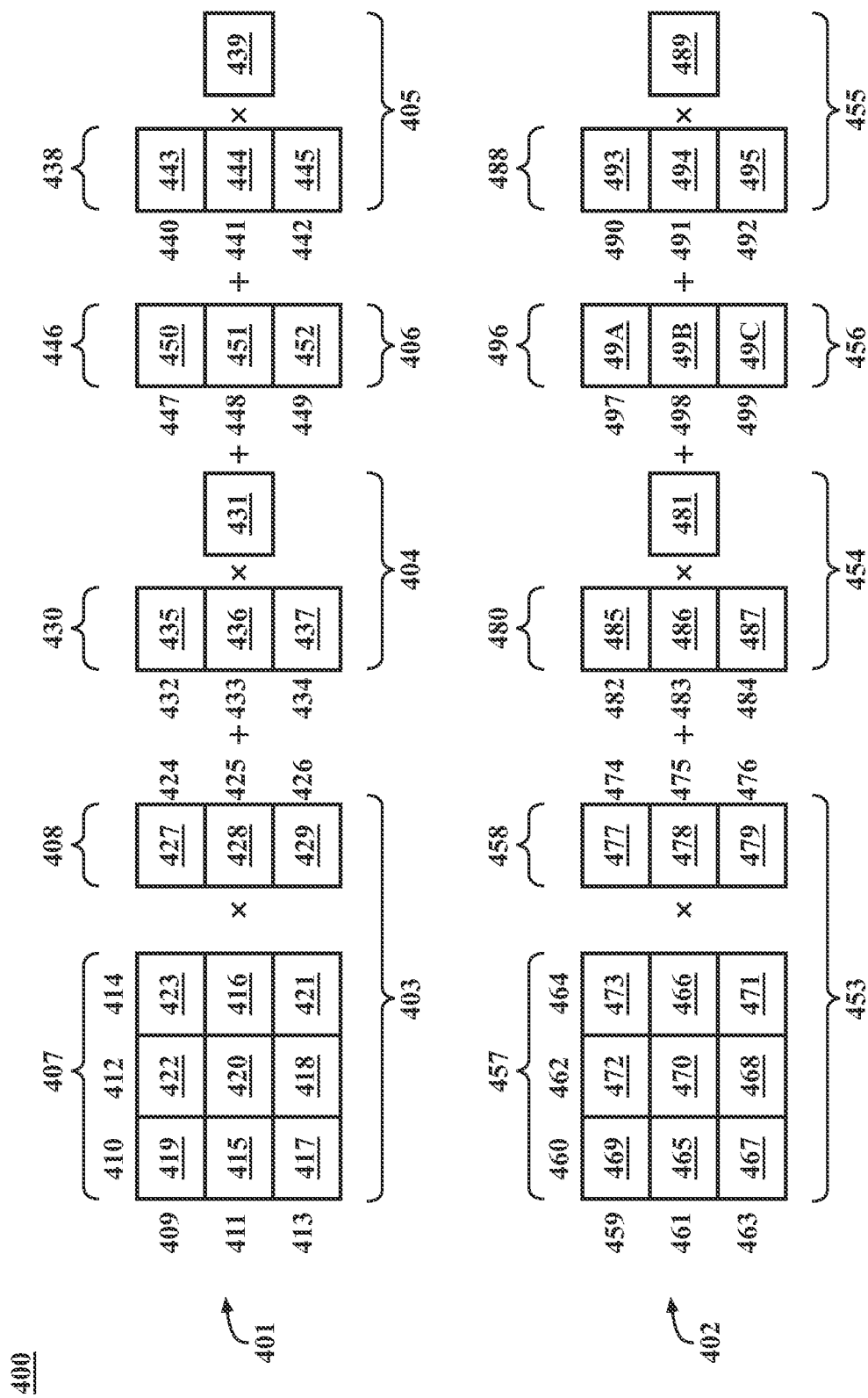
FIG. 4 is a diagram that illustrates an example of a mixture of affine time-varying systems that represents the evolution of the agent states of the agents in the environment illustrated in FIG. 1, according to the disclosed technologies.

FIG. 4 is a diagram that illustrates an example of a mixture of affine time-varying systems 400 that represents the evolution of the agent states of the agents in the environment 100, according to the disclosed technologies. The mixture of affine time-varying systems 400 can include, for example, a representation associated with a first mode 401 and a representation associated with a second mode 402.

With reference to FIGS. 1, 3, and 4, for example, the first mode 401 can be associated with the first mode I (illustrated in FIG. 1), which can be associated with a set of actions associated with traffic in the left lane 120 proceeding straight through the intersection 110; and the second mode 402 can be associated with the second mode II (illustrated in FIG. 1), which can be associated with a set of actions associated with traffic in the left lane 120 making, at the intersection 110, a left turn into the lane 128.

The representation associated with the first mode 401 can include an autonomous term 403 and a controlled term 404. Additionally, for example, the representation associated with the first mode 401 can include an uncertainty term 405. Additionally, for example, the representation associated with the first mode 401 can include an affine term 406.

The autonomous term 403 can include a first matrix 407 and a second matrix 408. The autonomous term 403 can be a product of the first matrix 407 multiplied by the second matrix 408.

The first matrix 407 can include, for example, a first row 409 and a first column 410 (associated with the mobile robot 102 illustrated in FIG. 1), a second row 411 and a second column 412 (associated with the first agent 130 illustrated in FIG. 1), and a third row 413 and a third column 414 (associated with the second agent 132 illustrated in FIG. 1). For example: (1) an element 415 of the first matrix 407 can represent an effect, at the first time, that the mobile robot 102 has on the first agent 130; (2) an element 416 of the first matrix 407 can represent an effect, at the first time, that the second agent 132 has on the first agent 130; (3) an element 417 of the first matrix 407 can represent an effect, at the first time, that the mobile robot 102 has on the second agent 132; and (4) an element 418 of the first matrix 407 can represent an effect, at the first time, that the first agent 130 has on the second agent 132. For example, information for the element 415, information for the element 416, information for the element 417, and information for the element 418 can be produced by the eleventh neural network 368 (illustrated in FIG. 3). For example: (1) an element 419 of the first matrix 407 can represent an effect, at the first time, that the mobile robot 102 has on itself; (2) an element 420 of the first matrix 407 can represent an effect, at the first time, that the first agent 130 has on itself; and (3) an element 421 of the first matrix 407 can represent an effect, at the first time, that the second agent 132 has on itself. For example, information for the element 419, information for the element 420, and information for the element 421 can be determined from a source different from the neural networks 304 (illustrated in FIG. 3). For example, the information for the element 419, the information for the element 420, and the information for the element 421 can be determined by dynamics. For example: (1) an element 422 of the first matrix 407 can represent an effect, at the first time, that the first agent 130 has on the mobile robot 102 and (2) an element 423 of the first matrix 407 can represent an effect, at the first time, that the second agent 132 has on the mobile robot 102. For example, information for the element 422 and information for the element 423 can be determined from a source different from the neural networks 304 (illustrated in FIG. 3). For example, because in an absence of control the first agent 130 and the second agent 132 do not have an effect on the mobile robot 102, the information for the element 422 and the information for the element 423 can be set to zero.

The second matrix 408 can include, for example, a first row 424 (associated with the mobile robot 102 illustrated in FIG. 1), a second row 425 (associated with the first agent 130 illustrated in FIG. 1), and a third row 426 (associated with the second agent 132 illustrated in FIG. 1). For example: (1) an element 427 of the second matrix 408 can represent states of the mobile robot 102 at the first time; (2) an element 428 of the second matrix 408 can represent states of the first agent 130 at the first time; and (3) an element 429 of the second matrix 408 can represent states of the second agent 132 at the first time.

The controlled term 404 can include a matrix 430 and a variable 431. The variable 431 can represent a future motion plan of the mobile robot 102 at the first time. The controlled term 404 can be a product of the matrix 430 multiplied by the variable 431. The matrix 430 can have, for example, a single column. The matrix 430 can include, for example, a first row 432 (associated with the mobile robot 102 illustrated in FIG. 1), a second row 433 (associated with the first agent 130 illustrated in FIG. 1), and a third row 434 (associated with the second agent 132 illustrated in FIG. 1). For example: (1) an element 435 of the matrix 430 can represent an effect, at the first time, that the control of the mobile robot 102 has on the mobile robot 102; (2) an element 436 of the matrix 430 can represent an effect, at the first time, that the control of the mobile robot 102 has on the first agent 130; and (3) an element 437 of the matrix 430 can represent an effect, at the first time, that the control of the mobile robot 102 has on the second agent 132. For example, information for the element 436 and information for the element 437 can be produced by the eleventh neural network 368 (illustrated in FIG. 3). For example, information for the element 435 can be determined from a source different from the neural networks 304 (illustrated in FIG. 3). For example, because an effect of a control of the mobile robot 102 on itself is known, the information for the element 435 does not need to be determined from the neural networks 304 (illustrated in FIG. 3).

The uncertainty term 405 can include a matrix 438 and a variable 439. The variable 439 can represent a distribution of noise in the mixture of affine time-varying systems 400 at the first time. The uncertainty term 405 can be a product of the matrix 438 multiplied by the variable 439. The matrix 438 can have, for example, a single column. The matrix 438 can include, for example, a first row 440 (associated with the mobile robot 102 illustrated in FIG. 1), a second row 441 (associated with the first agent 130 illustrated in FIG. 1), and a third row 442 (associated with the second agent 132 illustrated in FIG. 1). For example: (1) an element 443 of the matrix 438 can represent an effect that an uncertainty of the prediction has on the mobile robot 102; (2) an element 444 of the matrix 438 can represent an effect that the uncertainty of the prediction has on the first agent 130; and (3) an element 445 of the matrix 438 can represent an effect that the uncertainty of the prediction has on the second agent 132. For example, information for the element 444 and information for the element 445 can be produced by the eleventh neural network 368 (illustrated in FIG. 3). For example, information for the element 443 can be determined from a source different from the neural networks 304 (illustrated in FIG. 3). For example, because a current position, a control, and dynamics of the mobile robot 102 are known, the information for the element 443 does not need to be determined from the neural networks 304 (illustrated in FIG. 3).

The affine term 406 can include a matrix 446. The matrix 446 can have, for example, a single column. The matrix 446 can include, for example, a first row 447 (associated with the mobile robot 102 illustrated in FIG. 1), a second row 448 (associated with the first agent 130 illustrated in FIG. 1), and a third row 449 (associated with the second agent 132 illustrated in FIG. 1). For example: (1) an element 450 of the matrix 446 can represent an effect, at the first time, that a nonlinear aspect of the evolution of the agent states has on the mobile robot 102; (2) an element 451 of the matrix 446 can represent an effect that the nonlinear aspect of the evolution of the agent states has on the first agent 130; and (3) an element 452 of the matrix 446 can represent an effect that the nonlinear aspect of the evolution of the agent states has on the second agent 132. For example, information for the element 450, information for the element 451, and information for the element 452 can be determined from a source different from the neural networks 304 (illustrated in FIG. 3). For example, because a current position, a control, and dynamics of the mobile robot 102, the first agent 130, and the second agent 132 are known, the information for the element 450, the information for the element 451, and the information for the element 452 do not need to be determined from the neural networks 304 (illustrated in FIG. 3).

The representation associated with the second mode 402 can include an autonomous term 453 and a controlled term 454. Additionally, for example, the representation associated with the second mode 402 can include an uncertainty term 455. Additionally, for example, the representation associated with the second mode 402 can include an affine term 456.

The autonomous term 453 can include a first matrix 457 and a second matrix 458. The autonomous term 453 can be a product of the first matrix 457 multiplied by the second matrix 458.

The first matrix 457 can include, for example, a first row 459 and a first column 460 (associated with the mobile robot 102 illustrated in FIG. 1), a second row 461 and a second column 462 (associated with the first agent 130 illustrated in FIG. 1), and a third row 463 and a third column 464 (associated with the second agent 132 illustrated in FIG. 1). For example: (1) an element 465 of the first matrix 457 can represent an effect, at the first time, that the mobile robot 102 has on the first agent 130; (2) an element 466 of the first matrix 457 can represent an effect, at the first time, that the second agent 132 has on the first agent 130; (3) an element 467 of the first matrix 457 can represent an effect, at the first time, that the mobile robot 102 has on the second agent 132; and (4) an element 468 of the first matrix 457 can represent an effect, at the first time, that the first agent 130 has on the second agent 132. For example, information for the element 465, information for the element 466, information for the element 467, and information for the element 468 can be produced by the eleventh neural network 368 (illustrated in FIG. 3). For example: (1) an element 469 of the first matrix 457 can represent an effect, at the first time, that the mobile robot 102 has on itself; (2) an element 470 of the first matrix 457 can represent an effect, at the first time, that the first agent 130 has on itself; and (3) an element 471 of the first matrix 457 can represent an effect, at the first time, that the second agent 132 has on itself. For example, information for the element 469, information for the element 470, and information for the element 471 can be determined from a source different from the neural networks 304 (illustrated in FIG. 3). For example, the information for the element 469, the information for the element 470, and the information for the element 471 can be determined by dynamics. For example: (1) an element 472 of the first matrix 457 can represent an effect, at the first time, that the first agent 130 has on the mobile robot 102 and (2) an element 473 of the first matrix 457 can represent an effect, at the first time, that the second agent 132 has on the mobile robot 102. For example, information for the element 472 and information for the element 473 can be determined from a source different from the neural networks 304 (illustrated in FIG. 3). For example, because in an absence of control the first agent 130 and the second agent 132 do not have an effect on the mobile robot 102, the information for the element 472 and the information for the element 473 can be set to zero.

The second matrix 458 can include, for example, a first row 474 (associated with the mobile robot 102 illustrated in FIG. 1), a second row 475 (associated with the first agent 130 illustrated in FIG. 1), and a third row 476 (associated with the second agent 132 illustrated in FIG. 1). For example: (1) an element 477 of the second matrix 458 can represent states of the mobile robot 102 at the first time; (2) an element 478 of the second matrix 458 can represent states of the first agent 130 at the first time; and (3) an element 479 of the second matrix 458 can represent states of the second agent 132 at the first time.

The controlled term 454 can include a matrix 480 and a variable 481. The variable 481 can represent a future motion plan of the mobile robot 102 at the first time. The controlled term 454 can be a product of the matrix 480 multiplied by the variable 481. The matrix 480 can have, for example, a single column. The matrix 480 can include, for example, a first row 482 (associated with the mobile robot 102 illustrated in FIG. 1), a second row 483 (associated with the first agent 130 illustrated in FIG. 1), and a third row 484 (associated with the second agent 132 illustrated in FIG. 1). For example: (1) an element 485 of the matrix 480 can represent an effect, at the first time, that the control of the mobile robot 102 has on the mobile robot 102; (2) an element 486 of the matrix 480 can represent an effect, at the first time, that the control of the mobile robot 102 has on the first agent 130; and (3) an element 487 of the matrix 480 can represent an effect, at the first time, that the control of the mobile robot 102 has on the second agent 132. For example, information for the element 486 and information for the element 487 can be produced by the eleventh neural network 368 (illustrated in FIG. 3). For example, information for the element 485 can be determined from a source different from the neural networks 304 (illustrated in FIG. 3). For example, because an effect of a control of the mobile robot 102 on itself is known, the information for the element 485 does not need to be determined from the neural networks 304 (illustrated in FIG. 3).

The uncertainty term 455 can include a matrix 488 and a variable 489. The variable 489 can represent a distribution of noise in the mixture of affine time-varying systems 400 at the first time. The uncertainty term 455 can be a product of the matrix 488 multiplied by the variable 489. The matrix 488 can have, for example, a single column. The matrix 488 can include, for example, a first row 490 (associated with the mobile robot 102 illustrated in FIG. 1), a second row 491 (associated with the first agent 130 illustrated in FIG. 1), and a third row 492 (associated with the second agent 132 illustrated in FIG. 1). For example: (1) an element 493 of the matrix 488 can represent an effect that an uncertainty of the prediction has on the mobile robot 102; (2) an element 494 of the matrix 488 can represent an effect that the uncertainty of the prediction has on the first agent 130; and (3) an element 495 of the matrix 488 can represent an effect that the uncertainty of the prediction has on the second agent 132. For example, information for the element 494 and information for the element 495 can be produced by the eleventh neural network 368 (illustrated in FIG. 3). For example, information for the element 493 can be determined from a source different from the neural networks 304 (illustrated in FIG. 3). For example, because a current position, a control, and dynamics of the mobile robot 102 are known, the information for the element 493 does not need to be determined from the neural networks 304 (illustrated in FIG. 3).

The affine term 456 can include a matrix 496. The matrix 496 can have, for example, a single column. The matrix 496 can include, for example, a first row 497 (associated with the mobile robot 102 illustrated in FIG. 1), a second row 498 (associated with the first agent 130 illustrated in FIG. 1), and a third row 499 (associated with the second agent 132 illustrated in FIG. 1). For example: (1) an element 49A of the matrix 496 can represent an effect, at the first time, that a nonlinear aspect of the evolution of the agent states has on the mobile robot 102; (2) an element 49B of the matrix 496 can represent an effect that the nonlinear aspect of the evolution of the agent states has on the first agent 130; and (3) an element 49C of the matrix 496 can represent an effect that the nonlinear aspect of the evolution of the agent states has on the second agent 132. For example, information for the element 49A, information for the element 49B, and information for the element 49C can be determined from a source different from the neural networks 304 (illustrated in FIG. 3). For example, because a current position, a control, and dynamics of the mobile robot 102, the first agent 130, and the second agent 132 are known, the information for the element 49A, the information for the element 49B, and the information for the element 49C do not need to be determined from the neural networks 304 (illustrated in FIG. 3).

Returning to FIG. 2, in a third configuration, the planned trajectory, determined from the prediction of the agent states, can be determined, for a specific count of the equal intervals of time after the first time, using a model predictive control framework.

For example, the model predictive control framework can include a minimization function. The minimization function can have a first term and a second term. The first term can include a first summation function, from the first time to a time that is the single interval of time before a time at the specific count of the equal intervals of time after the first time, of a first function. The first function can have, as a first domain, the agent states represented by the mixture of affine time-varying systems. The first function can have, as a second domain, a variable representing a future motion plan of the mobile robot. The first function can represent a deviation between a position of the mobile robot and a position on the planned trajectory. The second term can include a second function. The second function can have, as a domain, the agent states represented by the mixture of affine time-varying systems at the time at the specific count of the equal intervals of time after the first time. The second function can represent a deviation between a final position of the mobile robot and a final position of the planned trajectory.

Additionally, for example, the mixture of affine time-varying systems can represent the evolution of the agent states for a plurality of modes. A mode, of the plurality of modes, can be associated with a corresponding set of actions associated with a corresponding scenario in the environment.

With reference to FIG. 1, for example, the plurality of modes can include a first mode I (illustrated in FIG. 1) and a second mode II (illustrated in FIG. 1). The first mode I can be associated with a set of actions associated with traffic in the left lane 120 proceeding straight through the intersection 110; and the second mode II can be associated with a set of actions associated with traffic in the left lane 120 making, at the intersection 110, a left turn into the lane 128.

Returning to FIG. 2, the plurality of modes can have a count of a number of modes. The first term of the minimization function can further include a second summation function, for the count of the number of modes, of the first summation function. The second term of the minimization function can further include a third summation function, for the count of the number of modes, of the second function.

For example, an equation for the minimization function for the model predictive control framework can be:

$$\min_{\bar{s}, \bar{u}_R} \sum_{z \in Z} h(s_z^{(T)}) + \sum_{z \in Z} \sum_{t=1}^{T-1} g(s_z^{(t)}, u_{R,z}^{(t)})$$

in which s represents the agent states, $u_R$ represents a variable that represents a future motion plan of the mobile robot, z represents a mode of evolution of the agent states in a set of Z modes, T represents the specific count of the equal intervals of time, g represents the first function that represents a deviation between a position of the mobile robot and a position on the planned trajectory, and h represents the second function that represents a deviation between a final position of the mobile robot and a final position of the planned trajectory.

One of skill in the art understands, in light of the description herein, particularly by comparing the equation for the mixture of affine time-varying systems with the equation for the minimization function for the model predictive control framework, that terms of the minimization function for the model predictive control framework can be constructed in in a manner that facilitates directly incorporating the mixture of affine time-varying systems into a prediction system and into a planning system that is based on a model predictive control framework. This can improve computational efficiency in executions of functions of a prediction system component of an autonomous motion technology system and in executions of functions of a planning system component of the autonomous motion technology system.

In a fourth configuration, the instructions that cause the mobile robot to move according to the planned trajectory determined from the prediction can include instructions that function to control the processor 202 to communicate the prediction to a planning system component of an autonomous motion technology system. The instructions that cause the mobile robot to move according to the planned trajectory determined from the prediction can also include instructions that function to control the processor 202 to determine, by the planning system component using the prediction, the planned trajectory. The instructions that cause the mobile robot to move according to the planned trajectory determined from the prediction can also include instructions that function to control the processor 202 to produce, by the planning system component, a control signal to cause the mobile robot to move according to the planned trajectory.

Figure 5:
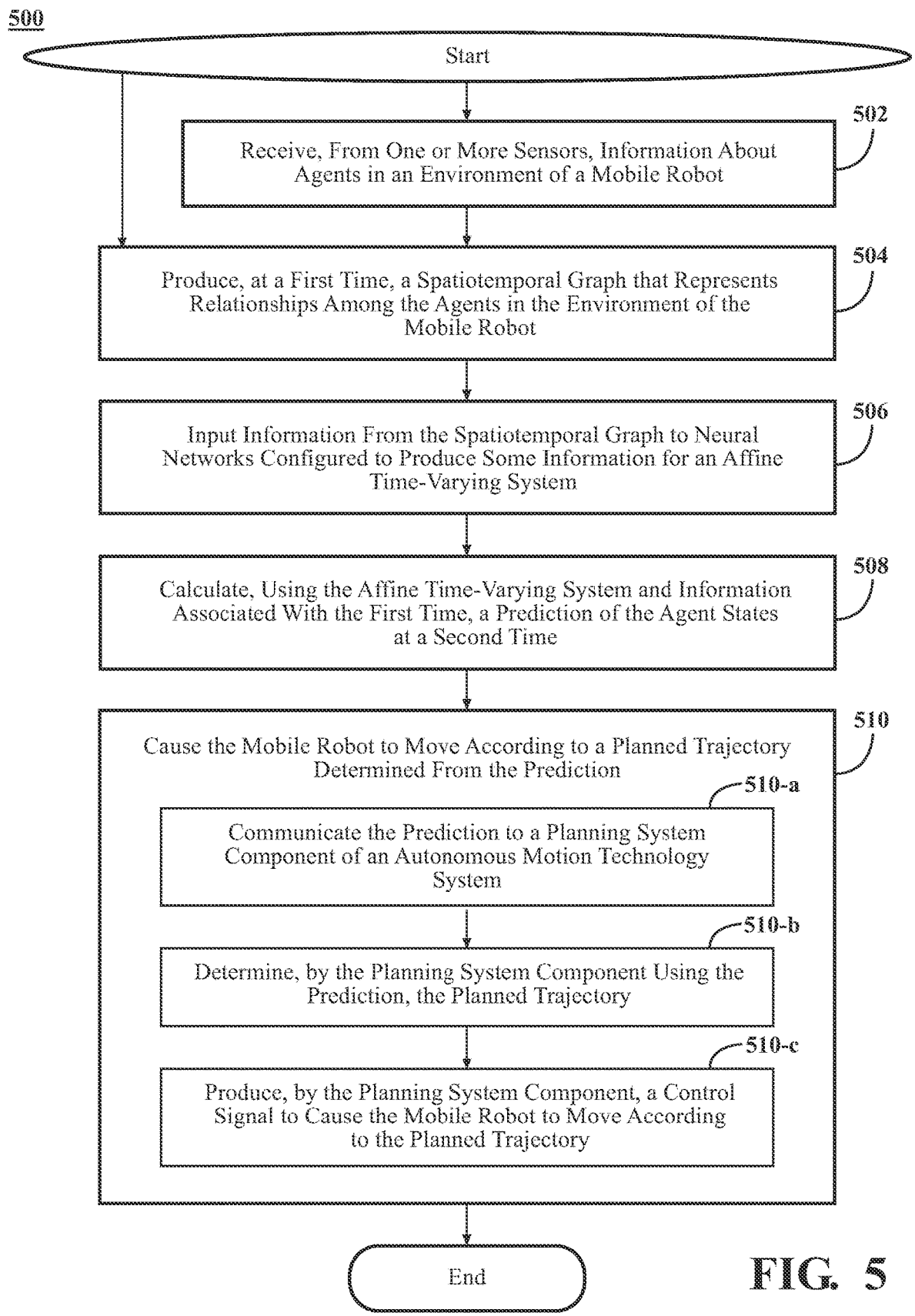
FIG. 5 includes a flow diagram that illustrates an example of a method for causing a mobile robot to move according to a planned trajectory, according to the disclosed technologies.

FIG. 5 includes a flow diagram that illustrates an example of a method 500 for causing a mobile robot to move according to a planned trajectory, according to the disclosed technologies. The method 500 is described from the perspective of the system 200 illustrated in FIG. 2. Although the method 500 is described in combination with the system 200, one of skill in the art understands, in light of the description herein, that the method 500 is not limited to being implemented by the system 200. Rather, the system 200 is an example of a system that may be used to implement the method 500. For example, the method 500 can be performed by an autonomous mobile agent. For example, the autonomous mobile agent can include an autonomous vehicle, a mobile robot, or the like.

In FIG. 5, in the method 500, in a first configuration, at an operation 502, the communications device 210 can receive, from the one or more sensors 212, information about agents in an environment of the mobile robot. For example, the mobile robot can an autonomous vehicle.

At an operation 504, the affine time-varying system production module 206 can produce, at a first time, a spatiotemporal graph. The spatiotemporal graph can represent relationships among the agents in the environment of the mobile robot.

At an operation 506, the affine time-varying system production module 206 can input information from the spatiotemporal graph to neural networks. The neural networks can be configured to produce some information for a mixture of affine time-varying systems. The mixture of affine time-varying systems can represent an evolution of agent states in the environment.

At an operation 508, the planned trajectory production module 208 can calculate, using the mixture of affine time-varying systems and information associated with the first time, a prediction of the agent states at a second time.

At an operation 510, the planned trajectory production module 208 can cause the mobile robot to move according to the planned trajectory determined from the prediction.

For example, the mobile robot can be one of the agents in the environment. For example, the mixture of affine time-varying systems can represent the evolution of the agent states in equal intervals of time. The second time can be a single interval of time after the first time.

For example, the spatiotemporal graph can represent a single agent, of the agents, as a node. The spatiotemporal graph can include a directed edge from a first node to a second node. The second node can have a first state history. The first state history can be for a first specific count of the equal intervals of time before the first time. The first state history can be encoded by a first neural network of the neural networks. For example, the first neural network can be a first long short-term memory neural network. For example, the first neural network can have 32 hidden dimensions. The first node can have a second state history. The second state history can be for the first specific count of the equal intervals of time before the first time. The first node can have a modified state history. The modified state history can be a difference between the second state history and a state of the second node at the first time. The modified state history can be encoded by a second neural network of the neural networks. For example, the second neural network can be a second long short-term memory neural network. For example, the second neural network can have 32 hidden dimensions.

For example, a motion plan of the mobile robot for a second specific count of the equal intervals of time after the first time can be encoded by a third neural network of the neural networks. For example, the third neural network can be a bi-directional long short-term memory neural network. For example, the third neural network can have 32 hidden dimensions.

For example, an output of the first neural network, an output of the second neural network, and an output of the third neural network can be included in a concatenated vector.

For example, the concatenated vector can be decoded by a fourth neural network of the neural networks to produce matrices for the first time. For example, the fourth neural network can be a gated recurrent unit neural network. For example, the fourth neural network can be a 128-dimensional gated recurrent unit neural network.

Additionally, for example, the mixture of affine time-varying systems can represent the evolution of the agent states for a first mode and a second mode (and one or more additional modes). The first mode can be associated with a set of actions associated with a first scenario in the environment. The second mode can be associated with a set of actions associated with a second scenario in the environment. In this example, the matrices for the first time can include: (1) first matrices for the first time and the first mode and (2) second matrices for the first time and the second mode.

For example, the some information for the mixture of affine time-varying systems produced by the neural networks can include: (1) some information for an autonomous term of the mixture of affine time-varying systems and (2) some information for a controlled term of the mixture of affine time-varying systems. The autonomous term can be included to represent the evolution of the agent states in an absence of control. The controlled term can be included to represent an effect of a control of the mobile robot on the evolution of the agent states.

For example, information for the autonomous term of the mixture of affine time-varying systems can include a first matrix. A first agent of the agents can be associated with a first row of the first matrix and a first column of the first matrix. A second agent of the agents can be associated with a second row of the first matrix and a second column of the first matrix. (One or more additional agents can be associated with one or more additional rows of the first matrix and one or more additional columns of the first matrix.) An element of the first matrix can represent an effect, at the first time, that an agent associated with a column of the element has on an agent associated with a row of the element.

Additionally, for example, information for elements of the first matrix associated with a row for the mobile robot can be determined from a source different from the neural networks. For example, because the element of the row for the mobile robot that represents the effect that the mobile robot has on itself can be determined by dynamics, information for this element does not need to be determined from the neural networks. For example, because in an absence of control other agents in the environment do not have an effect on the mobile robot, an element of the row for the mobile robot that represents an effect that an agent (other than the mobile robot) has on the mobile robot can be set to zero and, therefore, does not need to be determined from the neural networks.

Additionally, for example, information for a specific element of the first matrix in which an agent associated with a column of the specific element is the agent associated with a row of the specific element can determined from the source different from the neural networks. For example, because an element that represents an effect that an agent has on itself can be determined by dynamics, information for this element does not need to be determined from the neural networks.

For example, an element of the first matrix can include a sub-matrix. A count of a number of rows of the sub-matrix can be equal to a count of a number of agent states of a corresponding agent being represented by the mixture of affine time-varying systems. A count of a number of columns of the sub-matrix can be equal to the count of the number of rows of the sub-matrix.

For example, if the corresponding agent is a vehicle, then the agent states of the corresponding agent can include: (1) a position of the vehicle with respect to a coordinate system including: (a) a measure of the position with respect to a first dimension of the coordinate system and (b) a measure of the position with respect to a second dimension of the coordinate system, (2) a direction of a movement of the vehicle from the position, and (3) a speed of the movement.

For example, if the corresponding agent is a pedestrian, then the agent states of the corresponding agent can include: (1) a position of the pedestrian with respect to a coordinate system including: (a) a measure of the position with respect to a first dimension of the coordinate system and (b) a measure of the position with respect to a second dimension of the coordinate system and (2) a rate of change of the position with respect to time including: (a) a measure of the rate of change with respect to the first dimension and (b) a measure of the rate of change with respect to the second dimension.

Additionally, for example, the information for the autonomous term of the mixture of affine time-varying systems can further include a second matrix. A first row of the second matrix can be associated with the first agent. A second row of the second matrix can be associated with the second agent. (One or more additional rows of the second matrix can be associated with one or more additional agents.) An element of the second matrix can represent states of a corresponding agent at the first time. The autonomous term can be a product of the first matrix multiplied by the second matrix.

For example, information for the controlled term of the mixture of affine time-varying systems can include a matrix. The matrix can have a single column. A first agent of the agents can be associated with a first row of the matrix. A second agent of the agents can be associated with a second row of the matrix. (One or more additional agents can be associated with one or more additional rows of the matrix.) An element of the matrix can represent an effect, at the first time, that the control of the mobile robot has on an agent associated with a row of the element.

Additionally, for example, information for an element of the matrix associated with a row for the mobile robot can be determined from a source different from the neural networks. For example, because an effect of a control of the mobile robot on itself is known, this element does not need to be determined from the neural networks.

Additionally, for example, the information for the controlled term of the mixture of affine time-varying systems can further include a variable that represents a future motion plan of the mobile robot at the first time. The controlled term can be a product of the matrix multiplied by the variable.

Additionally, for example, the some information for the mixture of affine time-varying systems produced by the neural networks can further include some information for an uncertainty term of the mixture of affine time-varying systems. The uncertainty term can be included to represent an effect, at the first time, of an uncertainty of the prediction.

For example, information for the uncertainty term of the mixture of affine time-varying systems can include a matrix. The matrix can have a single column. A first agent of the agents can be associated with a first row of the matrix. A second agent of the agents can be associated with a second row of the matrix. (One or more additional agents can be associated with one or more additional rows of the matrix.) An element of the matrix can represent an effect that the uncertainty of the prediction has on an agent associated with a row of the element.

Additionally, for example, information for an element of the matrix associated with a row for the mobile robot can be determined from a source different from the neural networks. For example, because a current position, a control, and dynamics of the mobile robot are known, this element does not need to be determined from the neural networks. Moreover, because these parameters are known, there is little to no uncertainty about a next position of the mobile robot. Therefore, a value of this element likely can be zero or a small value (e.g., to account for a small degree of uncertainty associated with an event such as tire slippage).

Additionally, for example, the information for the uncertainty term of the mixture of affine time-varying systems can further include a variable that represents a distribution of noise in the mixture of affine time-varying systems at the first time. For example, because Gaussian distributions of noise have been well studied and are computationally efficient, the distribution of noise can be a Gaussian distribution of noise. The uncertainty term can be a product of the matrix multiplied by the variable.

Additionally, for example, the information for the mixture of affine time-varying systems can further include an affine term of the mixture of affine time-varying systems. The affine term can be included to represent a nonlinear aspect of the evolution of the agent states. That is, the affine term can be included to account for nonlinear aspects in a linearized mixture of affine time-varying systems. Information for the affine term of the mixture of affine time-varying systems can include a matrix. The matrix can have a single column. A first agent of the agents can be associated with a first row of the matrix. A second agent of the agents can be associated with a second row of the matrix. (One or more additional agents can be associated with one or more additional rows of the matrix.) An element of the matrix can represent an effect, at the first time, that the nonlinear aspect has on an agent associated with a row of the element. For example, information for elements of the matrix can be determined from a source different from the neural networks. For example, because dynamics of the agents are known, these elements do not need to be determined from the neural networks. For example, in a situation in which information for an element of the matrix associated with a row for an agent that lacks nonlinear aspects (e.g., a pedestrian), a value of this element can be zero.

In a second configuration, the planned trajectory, determined from the prediction of the agent states, can be determined, for a specific count of the equal intervals of time after the first time, using a model predictive control framework.

For example, the model predictive control framework can include a minimization function. The minimization function can have a first term and a second term. The first term can include a first summation function, from the first time to a time that is the single interval of time before a time at the specific count of the equal intervals of time after the first time, of a first function. The first function can have, as a first domain, the agent states represented by the mixture of affine time-varying systems. The first function can have, as a second domain, a variable representing a future motion plan of the mobile robot. The first function can represent a deviation between a position of the mobile robot and a position on the planned trajectory. The second term can include a second function. The second function can have, as a domain, the agent states represented by the mixture of affine time-varying systems at the time at the specific count of the equal intervals of time after the first time. The second function can represent a deviation between a final position of the mobile robot and a final position of the planned trajectory.

Additionally, for example, the mixture of affine time-varying systems can represent the evolution of the agent states for a plurality of modes. A mode, of the plurality of modes, can be associated with a corresponding set of actions associated with a corresponding scenario in the environment. The plurality of modes can have a count of a number of modes. The first term of the minimization function can further include a second summation function, for the count of the number of modes, of the first summation function. The second term of the minimization function can further include a third summation function, for the count of the number of modes, of the second function.

In a third configuration, at the operation 510, at an operation 510-*a*, the planned trajectory production module 208 can communicate the prediction to a planning system component of an autonomous motion technology system. At the operation 510, at an operation 510-*b*, the planned trajectory production module 208 can determine, by the planning system component using the prediction, the planned trajectory. At the operation 510, at an operation 510-*c*, the planned trajectory production module 208 can produce, by the planning system component, a control signal to cause the mobile robot to move according to the planned trajectory.

Figure 6:
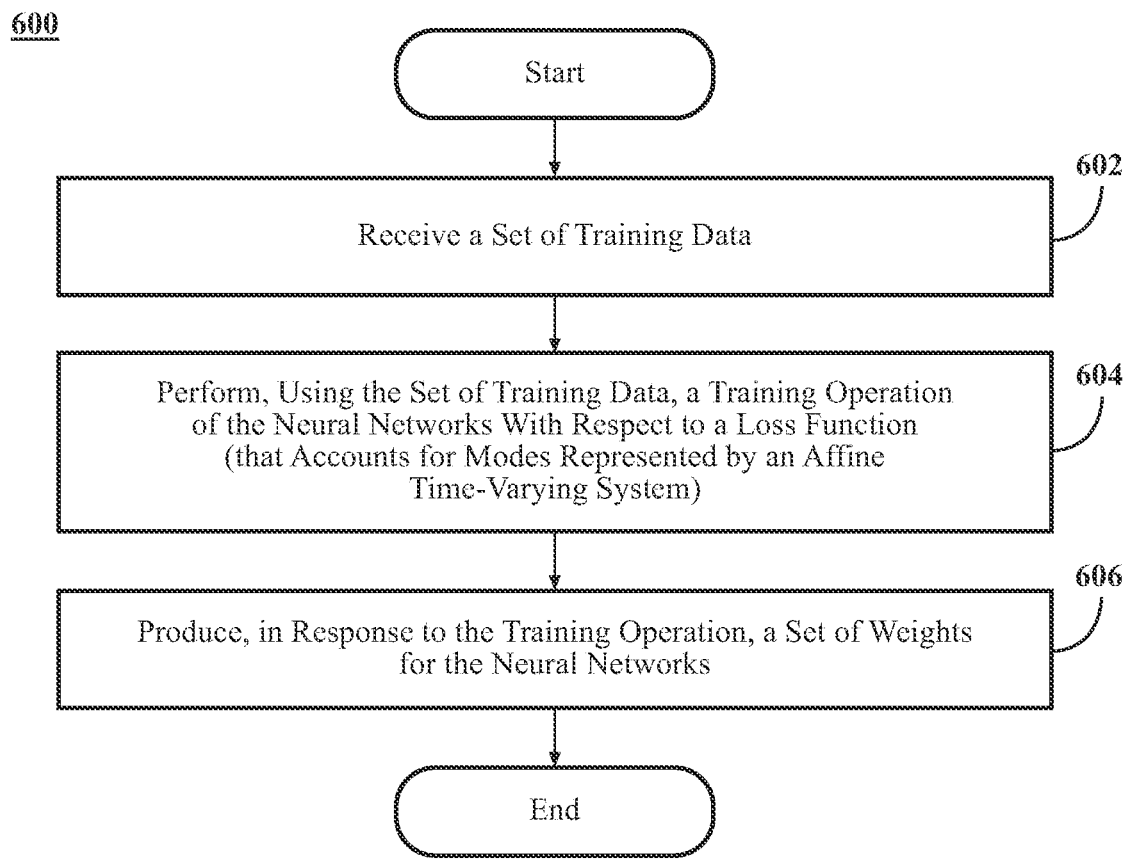
FIG. 6 includes a flow diagram that illustrates an example of a method that is associated with training the neural networks, according to the disclosed technologies.

FIG. 6 includes a flow diagram that illustrates an example of a method 600 that is associated with training the neural networks, according to the disclosed technologies. The method 600 is described from the perspective of the system 200 illustrated in FIG. 2. Although the method 600 is described in combination with the system 200, one of skill in the art understands, in light of the description herein, that the method 600 is not limited to being implemented by the system 200. Rather, the system 200 is an example of a system that may be used to implement the method 600.

In FIG. 6, in the method 600, at an operation 602, the training module 216 can receive a set of training data. At an operation 604, the training module 216 can perform, using the set of training data, a training operation of the neural networks with respect to a loss function. In a specific implementation in which the mixture of affine time-varying systems represents the evolution of the agent states for a first mode and a second mode (and one or more additional modes), then the loss function can account for the first mode and the second mode (and the one or more additional modes). At an operation 606, the training module 216 can produce, in response to the training operation, a set of weights for the neural networks.

Although the disclosed technologies have been described with respect to using a mixture of affine time-varying systems to represent an evolution of agent states of agents in an environment of a mobile robot, the disclosed technologies are not limited to this application. One of skill in the art understands, in light of the description herein, that mixture of affine time-varying systems can also be used in other applications including, for example, herding scenarios, sports analytics, and financial analysis applications.

Figure 7:
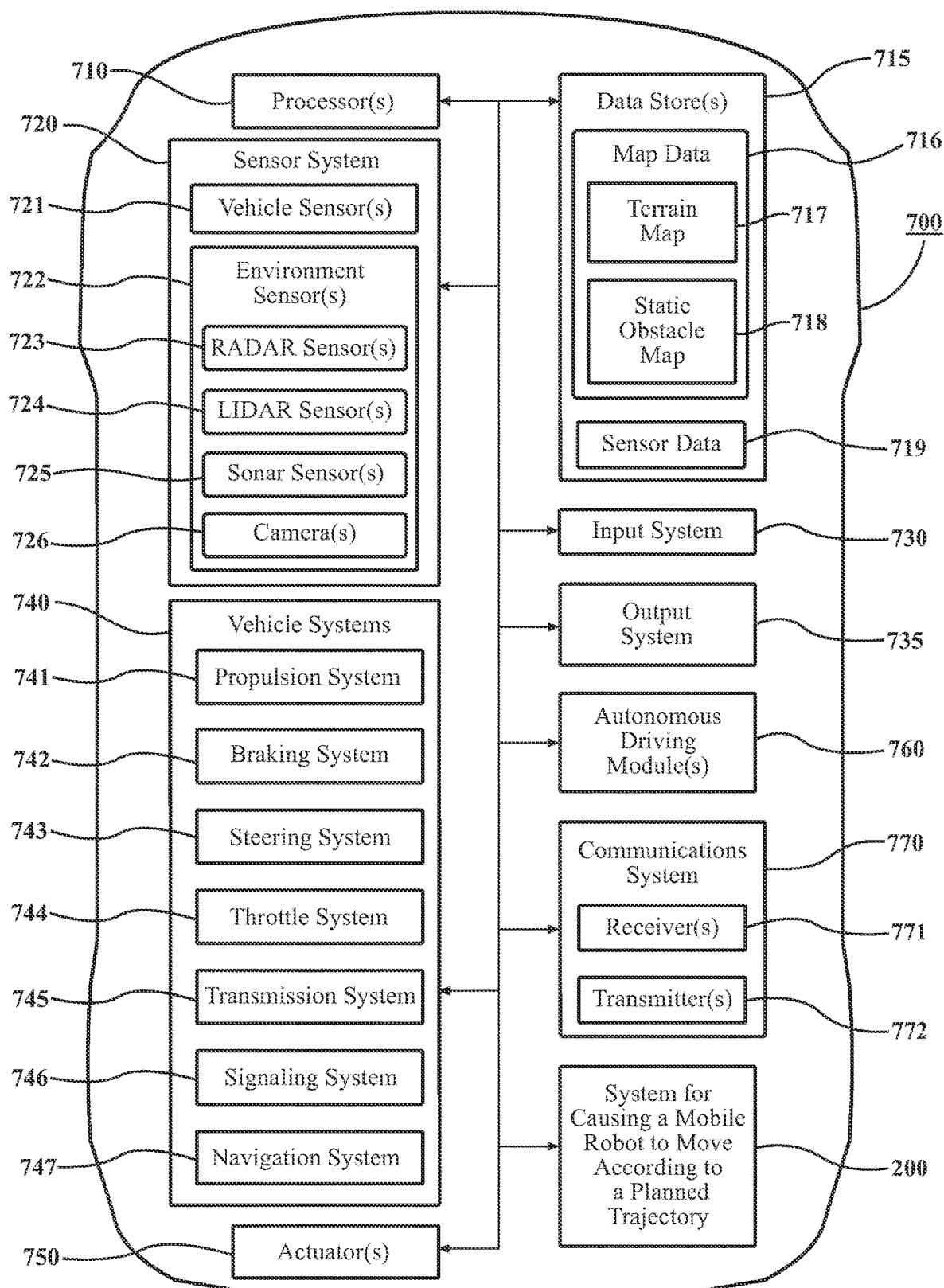
FIG. 7 includes a block diagram that illustrates an example of elements disposed on a vehicle, according to the disclosed technologies.

FIG. 7 includes a block diagram that illustrates an example of elements disposed on a vehicle 700, according to the disclosed technologies. As used herein, a "vehicle" can be any form of powered transport. In one or more implementations, the vehicle 700 can be an automobile. While arrangements described herein are with respect to automobiles, one of skill in the art understands, in light of the description herein, that embodiments are not limited to automobiles.

In some embodiments, the vehicle 700 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 700 is performed according to inputs received from a user (e.g., human driver). In one or more arrangements, the vehicle 700 can be a conventional vehicle that is configured to operate in only a manual mode.

In one or more embodiments, the vehicle 700 can be an automated vehicle. As used herein, "automated vehicle" can refer to a vehicle that operates in an automated mode. As used herein, "automated mode" can refer to navigating and/or maneuvering the vehicle 700 along a travel route using one or more computing systems to control the vehicle 700 with minimal or no input from a human driver. In one or more embodiments, the vehicle 700 can be highly automated or completely automated. In one embodiment, the vehicle 700 can be configured with one or more semi-automated operational modes in which one or more computing systems perform a portion of the navigation and/or maneuvering of the vehicle along a travel route, and a vehicle operator (i.e., driver) provides inputs to the vehicle 700 to perform a portion of the navigation and/or maneuvering of the vehicle 700 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 700 can include various elements. The vehicle 700 can have any combination of the various elements illustrated in FIG. 7. In various embodiments, it may not be necessary for the vehicle 700 to include all of the elements illustrated in FIG. 7. Furthermore, the vehicle 700 can have elements in addition to those illustrated in FIG. 7. While the various elements are illustrated in FIG. 7 as being located within the vehicle 700, one or more of these elements can be located external to the vehicle 700. Furthermore, the elements illustrated may be physically separated by large distances. For example, as described, one or more components of the disclosed system can be implemented within the vehicle 700 while other components of the system can be implemented within a cloud-computing environment, as described below. For example, the elements can include one or more processors 710, one or more data stores 715, a sensor system 720, an input system 730, an output system 735, vehicle systems 740, one or more actuators 750, one or more automated driving modules 760, a communications system 770, and the system 200 for causing a mobile robot to move according to a planned trajectory.

In one or more arrangements, the one or more processors 710 can be a main processor of the vehicle 700. For example, the one or more processors 710 can be an electronic control unit (ECU). For example, functions and/or operations of the processor 202 (illustrated in FIG. 2) can be realized by the one or more processors 710.

The one or more data stores 715 can store, for example, one or more types of data. For example, functions and/or operations of the memory 204 and the data store 214, or any combination thereof (illustrated in FIG. 2) can be realized by the one or more data stores 715. The one or more data store 715 can include volatile memory and/or non-volatile memory. Examples of suitable memory for the one or more data stores 715 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 715 can be a component of the one or more processors 710. Additionally or alternatively, the one or more data stores 715 can be operatively connected to the one or more processors 710 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 715 can store map data 716. The map data 716 can include maps of one or more geographic areas. In some instances, the map data 716 can include information or data on roads, traffic control devices, road markings, structures, features, and/or landmarks in the one or more geographic areas. The map data 716 can be in any suitable form. In some instances, the map data 716 can include aerial views of an area. In some instances, the map data 716 can include ground views of an area, including 360-degree ground views. The map data 716 can include measurements, dimensions, distances, and/or information for one or more items included in the map data 716 and/or relative to other items included in the map data 716. The map data 716 can include a digital map with information about road geometry. The map data 716 can be high quality and/or highly detailed.

In one or more arrangements, the map data 716 can include one or more terrain maps 717. The one or more terrain maps 717 can include information about the ground, terrain, roads, surfaces, and/or other features of one or more geographic areas. The one or more terrain maps 717 can include elevation data of the one or more geographic areas. The map data 716 can be high quality and/or highly detailed. The one or more terrain maps 717 can define one or more ground surfaces, which can include paved roads, unpaved roads, land, and other things that define a ground surface.

In one or more arrangements, the map data 716 can include one or more static obstacle maps 718. The one or more static obstacle maps 718 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 718 can have location data, size data, dimension data, material data, and/or other data associated with them. The one or more static obstacle maps 718 can include measurements, dimensions, distances, and/or information for one or more static obstacles. The one or more static obstacle maps 718 can be high quality and/or highly detailed. The one or more static obstacle maps 718 can be updated to reflect changes within a mapped area.

In one or more arrangements, the one or more data stores 715 can store sensor data 719. As used herein, "sensor data" can refer to any information about the sensors with which the vehicle 700 can be equipped including the capabilities of and other information about such sensors. The sensor data 719 can relate to one or more sensors of the sensor system 720. For example, in one or more arrangements, the sensor data 719 can include information about one or more lidar sensors 724 of the sensor system 720.

In some arrangements, at least a portion of the map data 716 and/or the sensor data 719 can be located in one or more data stores 715 that are located onboard the vehicle 700. Alternatively or additionally, at least a portion of the map data 716 and/or the sensor data 719 can be located in one or more data stores 715 that are located remotely from the vehicle 700.

The sensor system 720 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 720 includes a plurality of sensors, the sensors can work independently from each other. Alternatively, two or more of the sensors can work in combination with each other. In such a case, the two or more sensors can form a sensor network. The sensor system 720 and/or the one or more sensors can be operatively connected to the one or more processors 710, the one or more data stores 715, and/or another element of the vehicle 700 (including any of the elements illustrated in FIG. 7). The sensor system 720 can acquire data of at least a portion of the external environment of the vehicle 700 (e.g., nearby vehicles). The sensor system 720 can include any suitable type of sensor. Various examples of different types of sensors are described herein. However, one of skill in the art understands that the embodiments are not limited to the particular sensors described herein.

The sensor system 720 can include one or more vehicle sensors 721. The one or more vehicle sensors 721 can detect, determine, and/or sense information about the vehicle 700 itself. In one or more arrangements, the one or more vehicle sensors 721 can be configured to detect and/or sense position and orientation changes of the vehicle 700 such as, for example, based on inertial acceleration. In one or more arrangements, the one or more vehicle sensors 721 can include one or more accelerometers, one or more gyroscopes, an inertial measurement unit (WILT), a dead-reckoning system, a global navigation satellite system (GNSS), a global positioning system (GPS), a navigation system 747, and/or other suitable sensors. For example, functions and/or operations of the sensor(s) 212, (illustrated in FIG. 2) can be realized by the one or more vehicle sensors 721. The one or more vehicle sensors 721 can be configured to detect and/or sense one or more characteristics of the vehicle 700. In one or more arrangements, the one or more vehicle sensors 721 can include a speedometer to determine a current speed of the vehicle 700.

Alternatively or additionally, the sensor system 720 can include one or more environment sensors 722 configured to acquire and/or sense driving environment data. As used herein, "driving environment data" can include data or information about the external environment in which a vehicle is located or one or more portions thereof. For example, the one or more environment sensors 722 can be configured to detect, quantify, and/or sense obstacles in at least a portion of the external environment of the vehicle 700 and/or information/data about such obstacles. Such obstacles may be stationary objects and/or dynamic objects. The one or more environment sensors 722 can be configured to detect, measure, quantify, and/or sense other things in the external environment of the vehicle 700 such as, for example, lane markers, signs, traffic lights, traffic signs, lane lines, crosswalks, curbs proximate the vehicle 700, off-road objects, etc.

Various examples of sensors of the sensor system 720 are described herein. The example sensors may be part of the one or more vehicle sensors 721 and/or the one or more environment sensors 722. However, one of skill in the art understands that the embodiments are not limited to the particular sensors described.

In one or more arrangements, the one or more environment sensors 722 can include one or more radar sensors 723, one or more lidar sensors 724, one or more sonar sensors 725, and/or one more cameras 726. In one or more arrangements, the one or more cameras 726 can be one or more high dynamic range (HDR) cameras or one or more infrared (IR) cameras. For example, the one or more cameras 726 can be used to record a reality of a state of an item of information that can appear in the digital map.

The input system 730 can include any device, component, system, element, arrangement, or groups thereof that enable information/data to be entered into a machine. The input system 730 can receive an input from a vehicle passenger (e.g., a driver or a passenger). The output system 735 can include any device, component, system, element, arrangement, or groups thereof that enable information/data to be presented to a vehicle passenger (e.g., a driver or a passenger).

Various examples of the one or more vehicle systems 740 are illustrated in FIG. 7. However, one of skill in the art understands that the vehicle 700 can include more, fewer, or different vehicle systems. Although particular vehicle systems can be separately defined, each or any of the systems or portions thereof may be otherwise combined or segregated via hardware and/or software within the vehicle 700. For example, the one or more vehicle systems 740 can include a propulsion system 741, a braking system 742, a steering system 743, a throttle system 744, a transmission system 745, a signaling system 746, and/or the navigation system 747. Each of these systems can include one or more devices, components, and/or a combination thereof, now known or later developed.

The navigation system 747 can include one or more devices, applications, and/or combinations thereof, now known or later developed, configured to determine the geographic location of the vehicle 700 and/or to determine a travel route for the vehicle 700. The navigation system 747 can include one or more mapping applications to determine a travel route for the vehicle 700. The navigation system 747 can include a global positioning system, a local positioning system, a geolocation system, and/or a combination thereof.

The one or more actuators 750 can be any element or combination of elements operable to modify, adjust, and/or alter one or more of the vehicle systems 740 or components thereof responsive to receiving signals or other inputs from the one or more processors 710 and/or the one or more automated driving modules 760. Any suitable actuator can be used. For example, the one or more actuators 750 can include motors, pneumatic actuators, hydraulic pistons, relays, solenoids, and/or piezoelectric actuators.

The one or more processors 710 and/or the one or more automated driving modules 760 can be operatively connected to communicate with the various vehicle systems 740 and/or individual components thereof. For example, the one or more processors 710 and/or the one or more automated driving modules 760 can be in communication to send and/or receive information from the various vehicle systems 740 to control the movement, speed, maneuvering, heading, direction, etc. of the vehicle 700. The one or more processors 710 and/or the one or more automated driving modules 760 may control some or all of these vehicle systems 740 and, thus, may be partially or fully automated.

The one or more processors 710 and/or the one or more automated driving modules 760 may be operable to control the navigation and/or maneuvering of the vehicle 700 by controlling one or more of the vehicle systems 740 and/or components thereof. For example, when operating in an automated mode, the one or more processors 710 and/or the one or more automated driving modules 760 can control the direction and/or speed of the vehicle 700. The one or more processors 710 and/or the one or more automated driving modules 760 can cause the vehicle 700 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 770 can include one or more receivers 771 and/or one or more transmitters 772. The communications system 770 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 770 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 210 (illustrated in FIG. 2) can be realized by the communications system 770.

The vehicle 700 can include one or more modules, at least some of which are described herein. The modules can be implemented as computer-readable program code that, when executed by the one or more processors 710, implement one or more of the various processes described herein. One or more of the modules can be a component of the one or more processors 710. Alternatively or additionally, one or more of the modules can be executed on and/or distributed among other processing systems to which the one or more processors 710 can be operatively connected. The modules can include instructions (e.g., program logic) executable by the one or more processors 710. Alternatively or additionally, the one or more data store 715 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 700 can include one or more automated driving modules 760. The one or more automated driving modules 760 can be configured to receive data from the sensor system 720 and/or any other type of system capable of capturing information relating to the vehicle 700 and/or the external environment of the vehicle 700. In one or more arrangements, the one or more automated driving modules 760 can use such data to generate one or more driving scene models. The one or more automated driving modules 760 can determine position and velocity of the vehicle 700. The one or more automated driving modules 760 can determine the location of obstacles, obstacles, or other environmental features including traffic signs, trees, shrubs, neighboring vehicles, pedestrians, etc.

The one or more automated driving modules 760 can be configured to receive and/or determine location information for obstacles within the external environment of the vehicle 700 for use by the one or more processors 710 and/or one or more of the modules described herein to estimate position and orientation of the vehicle 700, vehicle position in global coordinates based on signals from a plurality of satellites, or any other data and/or signals that could be used to determine the current state of the vehicle 700 or determine the position of the vehicle 700 with respect to its environment for use in either creating a map or determining the position of the vehicle 700 in respect to map data.

The one or more automated driving modules 760 can be configured to determine one or more travel paths, current automated driving maneuvers for the vehicle 700, future automated driving maneuvers and/or modifications to current automated driving maneuvers based on data acquired by the sensor system 720, driving scene models, and/or data from any other suitable source such as determinations from the sensor data 719. As used herein, "driving maneuver" can refer to one or more actions that affect the movement of a vehicle. Examples of driving maneuvers include: accelerating, decelerating, braking, turning, moving in a lateral direction of the vehicle 700, changing travel lanes, merging into a travel lane, and/or reversing, just to name a few possibilities. The one or more automated driving modules 760 can be configured to implement determined driving maneuvers. The one or more automated driving modules 760 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 760 can be configured to execute various vehicle functions and/or to transmit data to, receive data from, interact with, and/or control the vehicle 700 or one or more systems thereof (e.g., one or more of vehicle systems 740). For example, functions and/or operations of an automotive navigation system can be realized by the one or more automated driving modules 760.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-7, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
an affine time-varying system production module including instructions that when executed by the processor cause the processor to:
produce, at a first time, a spatiotemporal graph representing relationships among agents in an environment of a mobile robot; and
input information associated with the spatiotemporal graph to neural networks to produce information for a mixture of affine time-varying systems representing an evolution of agent states, wherein the information for the mixture of affine time-varying systems includes information for a controlled term that includes a variable representing a future motion plan of the mobile robot at the first time and a matrix having a single column, a first agent of the agents being associated with a first row of the matrix, a second agent of the agents being associated with a second row of the matrix, and an element of the matrix representing an effect, at the first time, that a control of the mobile robot has on an agent associated with a row of the element, the controlled term being a product of the matrix multiplied by the variable; and a planned trajectory production module including instructions that when executed by the processor cause the processor to:

calculate, using the mixture of affine time-varying systems and information associated with the first time, a prediction of the agent states at a second time; and cause the mobile robot to move according to a planned trajectory determined from the prediction.

2. The system of claim 1, further comprising a communications device configured to receive, from a sensor, information about the agents in the environment.

3. The system of claim 1, wherein the memory further stores a training module including instructions that when executed by the processor cause the processor to train the neural networks.

4. The system of claim 1, wherein:
the mobile robot is one of the agents in the environment,
the mixture of affine time-varying systems represents the evolution of the agent states in equal intervals of time,
the second time is a single interval of time after the first time, and
the information for the mixture of affine time-varying systems further includes information for an autonomous term, the autonomous term being included to represent the evolution of the agent states in an absence of control.

5. The system of claim 4, wherein the information for the autonomous term comprises a first matrix, the first agent is associated with a first row of the first matrix and a first column of the first matrix, the second agent is associated with a second row of the first matrix and a second column of the first matrix, and an element of the first matrix represents an effect, at the first time, that an agent associated with a column of the element of the first matrix has on an agent associated with a row of the element of the first matrix.

6. The system of claim 5, wherein:
information for elements of the first matrix associated with a row for the mobile robot is determined from a source different from the neural networks; and
information for a specific element of the first matrix in which an agent associated with a column of the specific element is the agent associated with a row of the specific element is determined from the source different from the neural networks.

7. The system of claim 5, wherein the element of the first matrix comprises a sub-matrix, a count of a number of rows of the sub-matrix being equal to a count of a number of agent states of a corresponding agent being represented by the mixture of affine time-varying systems, a count of a number of columns of the sub-matrix being equal to the count of the number of rows of the sub-matrix.

8. The system of claim 7, wherein the corresponding agent is a vehicle and the agent states of the corresponding agent include:
a position of the vehicle with respect to a coordinate system including:
a measure of the position with respect to a first dimension of the coordinate system; and
a measure of the position with respect to a second dimension of the coordinate system;
a direction of a movement of the vehicle from the position; and
a speed of the movement.

9. The system of claim 7, wherein the corresponding agent is a pedestrian and the agent states of the corresponding agent include:
a position of the pedestrian with respect to a coordinate system including:
a measure of the position with respect to a first dimension of the coordinate system; and
a measure of the position with respect to a second dimension of the coordinate system; and
a rate of change of the position with respect to time including:
a measure of the rate of change with respect to the first dimension; and
a measure of the rate of change with respect to the second dimension.

10. A system, comprising:
a processor; and
a memory storing:
an affine time-varying system production module including instructions that when executed by the processor cause the processor to:
produce, at a first time, a spatiotemporal graph representing relationships among agents in an environment of a mobile robot; and
input information associated with the spatiotemporal graph to neural networks to produce information for a mixture of affine time-varying systems representing an evolution of agent states; and
a planned trajectory production module including instructions that when executed by the processor cause the processor to:
calculate, using the mixture of affine time-varying systems and information associated with the first time, a prediction of the agent states at a second time; and
cause the mobile robot to move according to a planned trajectory determined from the prediction,
wherein:
the mobile robot is one of the agents in the environment,
the mixture of affine time-varying systems represents the evolution of the agent states in equal intervals of time,
the second time is a single interval of time after the first time,
the information for the mixture of affine time-varying systems includes:
information for an autonomous term, the autonomous term being included to represent the evolution of the agent states in an absence of control, and
information for a controlled term, the controlled term being included to represent an effect of a control of the mobile robot on the evolution of the agent states,
information for elements of a first matrix associated with a row for the mobile robot is determined from a source different from the neural networks, and
information for a specific element of the first matrix in which an agent associated with a column of the specific element is the agent associated with a row of the specific element is determined from the source different from the neural networks,
wherein the information for the autonomous term further comprises a second matrix, a first row of the second matrix being associated with the first agent, a second row of the second matrix being associated with the second agent, an element of the second matrix representing states of a corresponding agent at the first time, and the autonomous term being a product of the first matrix multiplied by the second matrix.

11. The system of claim 4, wherein the controlled term represents an effect of a control of the mobile robot on the evolution of the agent states.

12. The system of claim 11, wherein information for an element of the matrix associated with a row for the mobile robot is determined from a source different from the neural networks.

13. The system of claim 4, wherein the information for the mixture of affine time-varying systems further includes information for an uncertainty term, the uncertainty term being included to represent an effect, at the first time, of an uncertainty of the prediction.

14. The system of claim 13, wherein the information for the uncertainty term comprises:
another matrix, the other matrix having a single column, the first agent being associated with a first row of the other matrix, the second agent being associated with a second row of the other matrix, and an element of the other matrix representing an effect that the uncertainty of the prediction has on an agent associated with a row of the element of the other matrix; and
a variable representing a distribution of noise in the mixture of affine time-varying systems at the first time, the uncertainty term being a product of the other matrix multiplied by the variable.

15. The system of claim 14, wherein information for an element of the other matrix associated with a row for the mobile robot is determined from a source different from the neural networks.

16. The system of claim 4, wherein the information for the mixture of affine time-varying systems further comprises an affine term, the affine term being included to represent a nonlinear aspect of the evolution of the agent states, information for the affine term comprising another matrix, the other matrix having a single column, the first agent being associated with a first row of the other matrix, the second agent being associated with a second row of the other matrix, and an element of the other matrix representing an effect, at the first time, that the nonlinear aspect has on an agent associated with a row of the element of the other matrix.

17. A method, comprising:
producing, by a processor at a first time, a spatiotemporal graph representing relationships among agents in an environment of a mobile robot;
inputting, by the processor, information associated with the spatiotemporal graph to neural networks to produce information for a mixture of affine time-varying systems representing an evolution of agent states, wherein the information for the mixture of affine time-varying systems includes information for a controlled term that includes a variable representing a future motion plan of the mobile robot at the first time and a matrix having a single column, a first agent of the agents being associated with a first row of the matrix, a second agent of the agents being associated with a second row of the matrix, and an element of the matrix representing an effect, at the first time, that a control of the mobile robot has on an agent associated with a row of the element, the controlled term being a product of the matrix multiplied by the variable;
calculating, by the processor using the mixture of affine time-varying systems and information associated with the first time, a prediction of the agent states at a second time; and
causing, by the processor, the mobile robot to move according to a planned trajectory determined from the prediction.

18. The method of claim 17, wherein the causing comprises:
communicating the prediction to a planning system;
determining, by the planning system using the prediction, the planned trajectory; and
producing, by the planning system, a control signal to cause the mobile robot to move according to the planned trajectory.

19. The method of claim 17, wherein:
the mobile robot is one of the agents in the environment,
the mixture of affine time-varying systems represents the evolution of the agent states in equal intervals of time,
the second time is a single interval of time after the first time,
the information for the mixture of affine time-varying systems further includes information for an autonomous term, the autonomous term being included to represent the evolution of the agent states in an absence of control, and
the planned trajectory is determined, for a specific count of the equal intervals of time after the first time, using a model predictive control framework.

20. A non-transitory computer-readable medium for causing a mobile robot to move according to a planned trajectory, the non-transitory computer-readable medium including instructions that when executed by one or more processors cause the one or more processors to:
produce, at a first time, a spatiotemporal graph representing relationships among agents in an environment of the mobile robot;
input information from the spatiotemporal graph to neural networks to produce information for a mixture of affine time-varying systems representing an evolution of agent states, wherein the information for the mixture of affine time-varying systems includes information for a controlled term that includes a variable representing a future motion plan of the mobile robot at the first time and a matrix having a single column, a first agent of the agents being associated with a first row of the matrix, a second agent of the agents being associated with a second row of the matrix, and an element of the matrix representing an effect, at the first time, that a control of the mobile robot has on an agent associated with a row of the element, the controlled term being a product of the matrix multiplied by the variable;
calculate, using the mixture of affine time-varying systems and information associated with the first time, a prediction of the agent states at a second time; and
cause the mobile robot to move according to the planned trajectory determined from the prediction.

* * * * *